(12) United States Patent
Kawamoto et al.

(10) Patent No.: US 7,443,404 B2
(45) Date of Patent: Oct. 28, 2008

(54) IMAGE DISPLAY APPARATUS, IMAGE DISPLAY CONTROLLING METHOD, AND IMAGE DISPLAY PROGRAM

(75) Inventors: Kyouichi Kawamoto, Ome (JP); Shoichi Nagatomo, Fussa (JP); Shinjiro Ishida, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 373 days.

(21) Appl. No.: 10/965,157

(22) Filed: Oct. 14, 2004

(65) Prior Publication Data

US 2005/0083351 A1 Apr. 21, 2005

(30) Foreign Application Priority Data

Oct. 17, 2003 (JP) ............................. 2003-358537
Nov. 14, 2003 (JP) ............................. 2003-385069

(51) Int. Cl.
*G09G 5/38* (2006.01)
(52) U.S. Cl. .................. 345/660; 345/659; 455/566; 455/556.1; 455/575.1; 455/575.3
(58) Field of Classification Search ........ 345/659, 345/660; 455/566, 556.1, 575.1, 575.3
See application file for complete search history.

(56) References Cited

U.S. PATENT DOCUMENTS

| | | | | |
|---|---|---|---|---|
| 5,249,049 | A * | 9/1993 | Kranawetter et al. | 348/473 |
| 5,299,007 | A * | 3/1994 | Saeger et al. | 348/503 |
| 5,309,234 | A * | 5/1994 | Kranawetter et al. | 348/473 |
| 5,434,625 | A * | 7/1995 | Willis | 348/564 |
| 5,576,769 | A * | 11/1996 | Lendaro | 348/511 |
| 5,659,369 | A * | 8/1997 | Imaiida | 348/556 |
| 6,262,763 | B1 * | 7/2001 | Totsuka et al. | 348/135 |
| 2001/0050875 | A1 * | 12/2001 | Kahn et al. | 365/229 |
| 2003/0058229 | A1 * | 3/2003 | Kawabe et al. | 345/204 |
| 2003/0202784 | A1 * | 10/2003 | Yamauchi et al. | 386/125 |
| 2004/0033058 | A1 * | 2/2004 | Reich | 386/111 |
| 2005/0026659 | A1 * | 2/2005 | Yang | 455/575.3 |

FOREIGN PATENT DOCUMENTS

| | | |
|---|---|---|
| JP | 07-288860 A | 10/1995 |
| JP | 08-154221 A | 6/1996 |
| JP | 08-163413 A | 6/1996 |
| KR | 20-314197 | 5/2003 |
| KR | 20-319752 | 7/2003 |

OTHER PUBLICATIONS

"'SO505i' of DoCoMo and 1,300,00-pixel CCD loading is put on the market on Jun. 4". Jun. 2, 2003. http://k-tai.impress.co.jp/cda/article/showcase_top/14019.html.
"Cellular phone new product Show Case, SO505i (cyber-silver), Jun. 4, 2003 sale". Jun. 6, 2006. http://k-tai.impress.co.jp/cda/article/news_toppage/13705.html.
"au, the movie cellular phone with a camera which a liquid crystal screen rotates 180 degrees 'A5305K'". Apr. 22, 2003. http://k-tai.impress.co.jp/cda/article/showcase_top/14295.html.
"Cellular phone new product Show Case, A5305K (formula red), May 16, 2003 sale". May 19, 2003. http://k-tai.impress.co.jp/cda/article/news_toppage/14245.html.

* cited by examiner

*Primary Examiner*—Javid A Amini
(74) *Attorney, Agent, or Firm*—Frishauf, Holtz, Goodman & Chick, P.C.

(57) ABSTRACT

When opening of a lens barrier is detected, a camera mode processing starts. An object image is displayed in the aspect ratio of 4:3, and a user can carry out photographing by carrying out a shutter operation using a first side switch with the right forefinger while holding a portable telephone with the right hand. When opening of the lens barrier is not detected, a wide-screen display is set and a movie playback mode processing starts. The user can watch a playing-back movie while holding the both ends of the portable telephone in a state of being folded with the both hands so as to keep the display device with the longer side at the top.

2 Claims, 29 Drawing Sheets

FIG.2A
FIG.2B
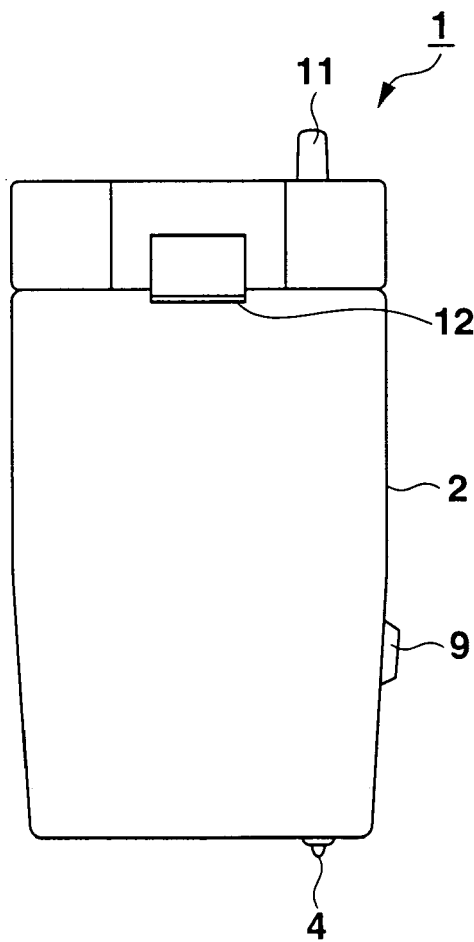
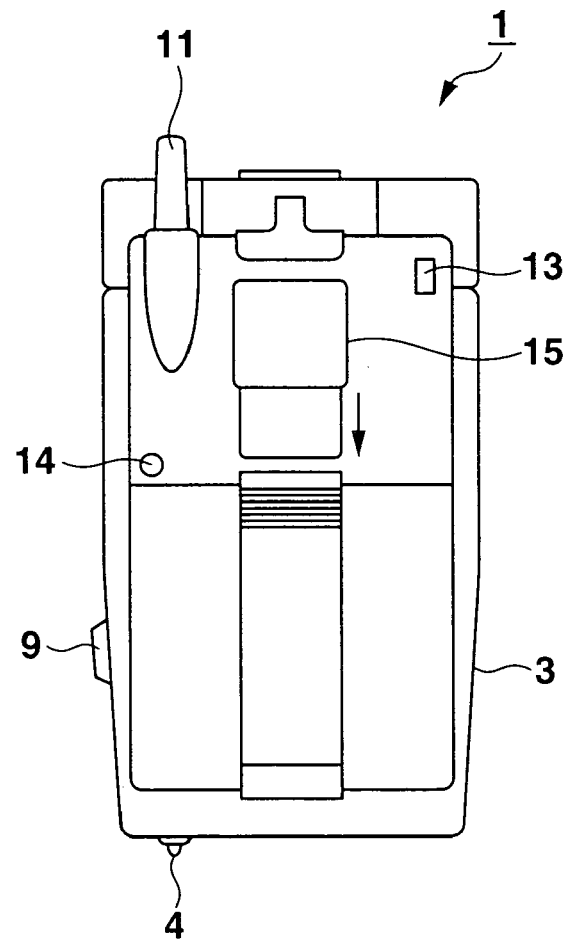

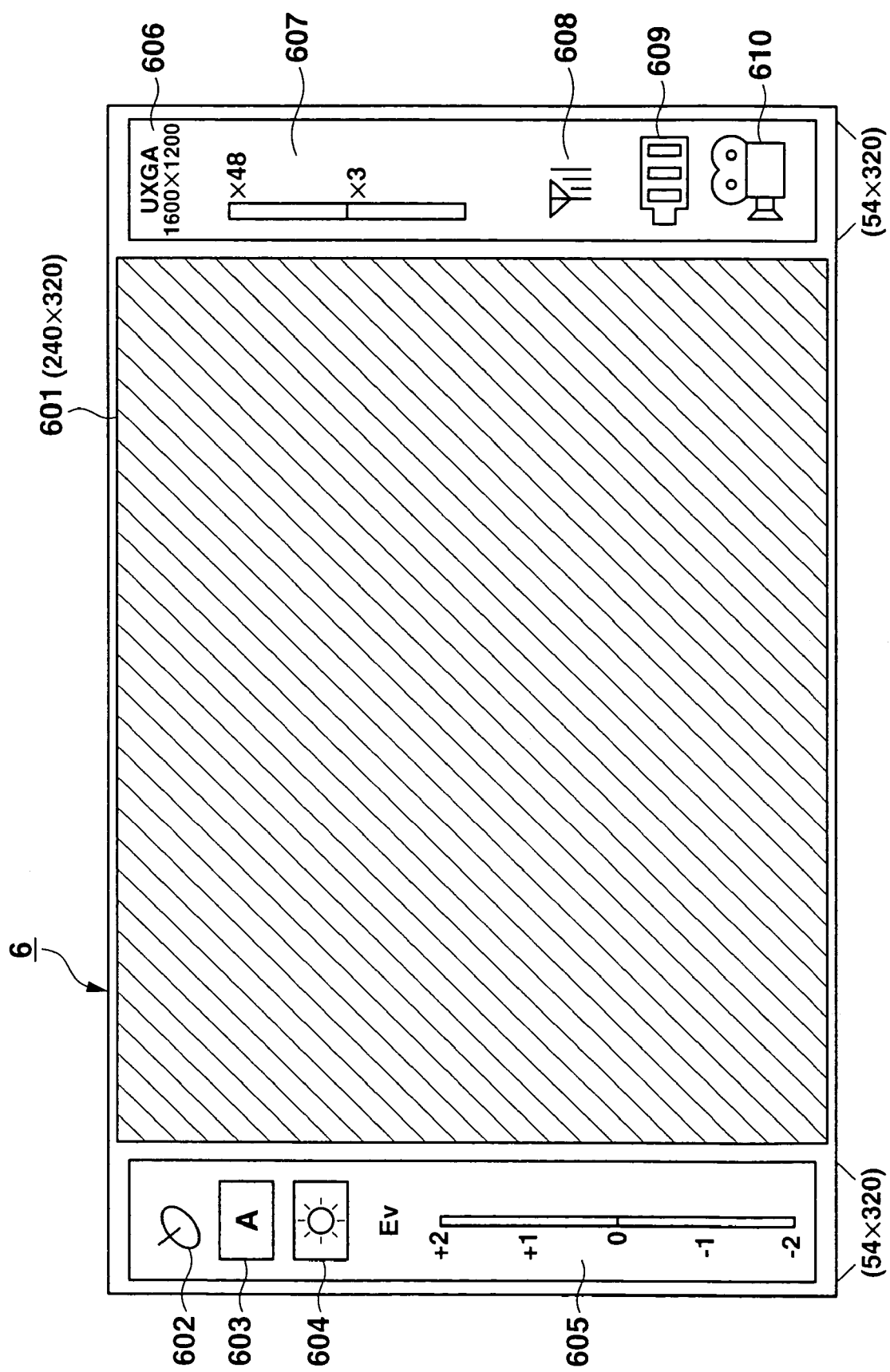

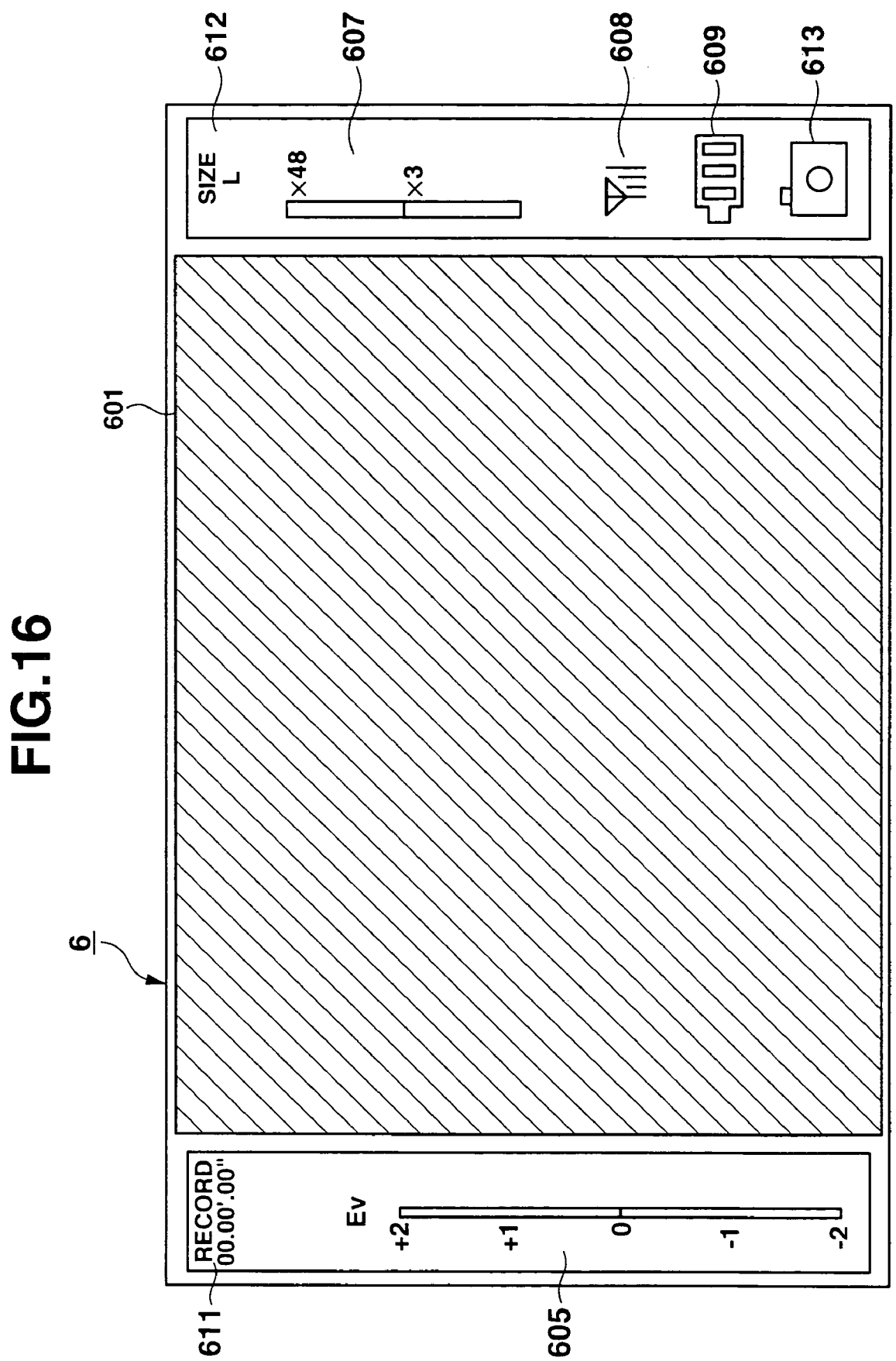

IMAGE DISPLAY APPARATUS, IMAGE DISPLAY CONTROLLING METHOD, AND IMAGE DISPLAY PROGRAM

CROSS-REFERENCE TO RELATED APPLICATIONS

This application is based upon and claims the benefit of priority from prior Japanese Patent Applications No. 2003-358537, filed Oct. 17, 2003; and No. 2003-385069, filed Nov. 14, 2003, the entire contents of which are incorporated herein by reference.

BACKGROUND OF THE INVENTION

1. Field of the Invention

The present invention relates to an image display apparatus having a wide screen, and an image display control method, and an image display control program.

2. Description of the Related Art

Recent portable devices can display even higher minute image or more various information accompanying an improvement in a resolution of a liquid-crystal display device.

On the other hand, due to the spread of digital terrestrial broadcasting, the distribution of multimedia contents by infrastructure for mobile devices such as a wireless LAN or the like, and the spread of DVDs, video can be displayed in a wide screen (16:9) on a display screen of, for example, a notebook model PC.

However, in a portable device picking up a still picture such as a digital camera or the like, because an image size of a still picture to be picked up is formed in the aspect ratio of 4:3, a display screen formed in the same aspect ratio is necessarily mounted on the device. Accordingly, video or a picture in the normal aspect ratio of 4:3 can be displayed. However, if an attempt is made to display video or a picture in 16:9, the video or the picture must be reduced to display.

BRIEF SUMMARY OF THE INVENTION

The present invention is directed to an image display apparatus which can display video in the aspect ratio of 16:9 even while having a function of picking up a still picture formed in the normal aspect ratio, and an image display control method and an image display control program.

According to an embodiment of the present invention, an image display apparatus comprises an image pickup device; a display device of an aspect ratio corresponding to a wide-display; and a first display control unit configured to display an image on the display device in full-screen when the image is in an aspect ratio corresponding to the wide-display or an image on the display device in a manner according to an aspect ratio based on a capture size of the image pickup device.

According to another embodiment of the present invention, an image display method for an electronic apparatus which comprises an image pickup device and a display device of an aspect ratio corresponding to a wide-display, the method comprises displaying an image on the display device in full-screen when the image is in an aspect ratio corresponding to the wide-display or an image on the display device in a manner according to the aspect ratio based on the capture size of the image pickup device.

According to still another embodiment of the present invention, a computer program product for use with an electronic apparatus which has an image pickup device and a display device of an aspect ratio corresponding to a wide-display, the computer program product being stored in a computer usable medium including computer readable program means, the computer program product comprising:

first computer readable program means for displaying an image on the display device in full-screen when the image is in an aspect ratio corresponding to the wide-display or an image on the display device in a manner according to an aspect ratio based on a capture size of the image pickup device.

According to further embodiment of the present invention, an image display apparatus comprises means for picking-up an image; displaying means of an aspect ratio corresponding to a wide-display; and means for displaying an image on the displaying means in full-screen when the image is in an aspect ratio corresponding to the wide-display or an image on the displaying means in a manner according to an aspect ratio based on a capture size of the means for picking-up an image.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 2A is a front view in a state in which the cover unit is folded so as to be a form in which a display device and a key input unit are made to face one another;

FIG. 2B is a rear view in the same state;

FIG. 15 is a diagram showing a display region in a camera mode;

FIG. 16 is a diagram showing a display region in a movie mode (the normal size);

DETAILED DESCRIPTION OF THE INVENTION

An embodiment of an image display apparatus, image display method, and image display program according to the present invention will now be described with reference to the accompanying drawings.

First Embodiment

Figure 1:
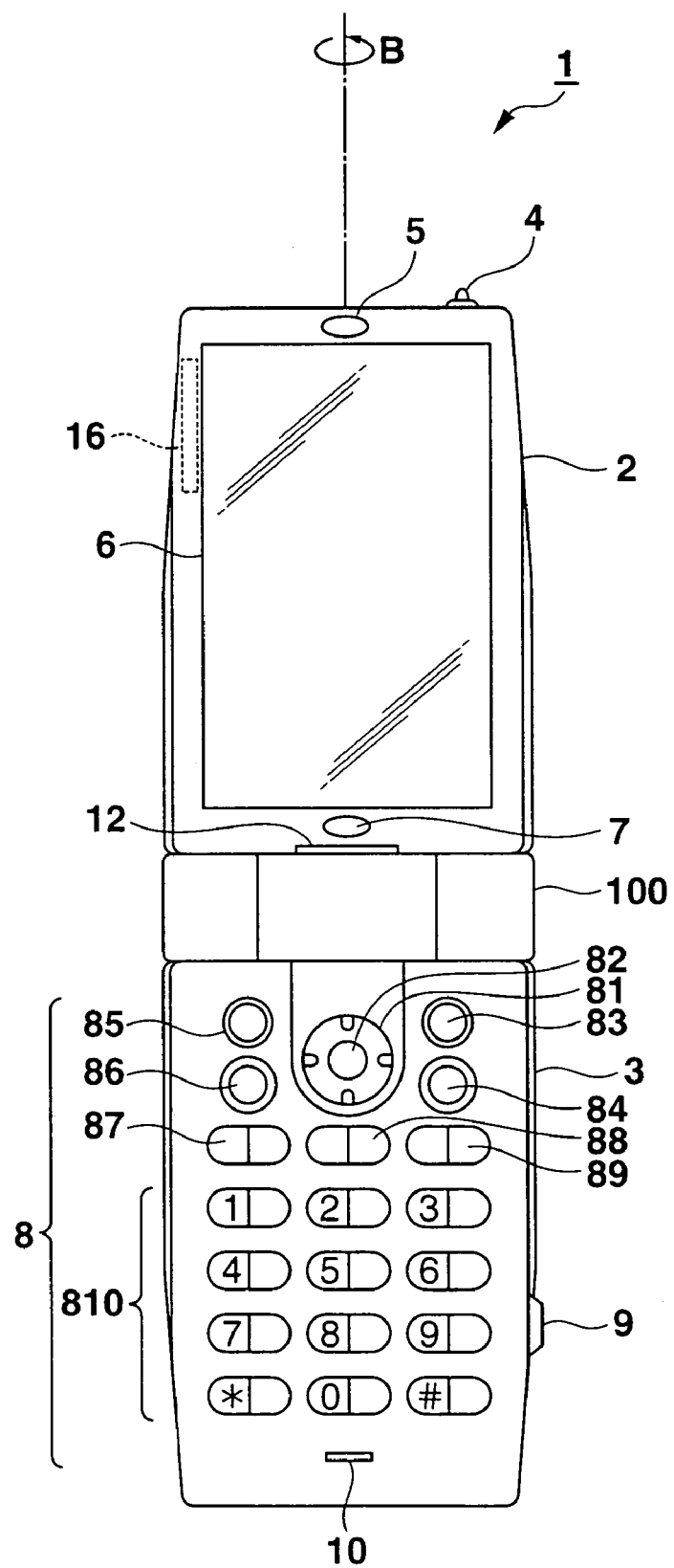
FIG. 1 is a front view of a portable telephone 1 according to a first embodiment of the present invention in a state in which a cover thereof is opened.

Hereinafter, a first embodiment of the present invention will be described with reference to the drawings. FIG. 1 is an external view corresponding to a front view of a portable telephone 1 according to the first embodiment in a state in which a cover thereof is opened. The portable telephone 1 has a function corresponding to the CDMA 20000 1xEV-DO (trademark) which is a derivative service from the CDMA 20000 1x (trademark) included in the CDMA system wireless communication standard IMT-2000, and is specialized for data communication.

The CDMA 20000 1xEV-DO is a type of wireless high speed data communication protocols called the HDR (High Data Rate), and is a service in which, in place of abolishing assurance for real-time responsiveness and communication at high-speed moving which are essential to audio communication (hand-over, RAKE receiving), the entire bandwidth of 1.25 MHz is allocated for data communication, and a downward transmission speed is set to 2.4 Mbps at maximum and an upward transmission speed is set to 153 Kbps at maximum.

In order to correspond to this service, the portable telephone 1 of the present embodiment has a wireless communication module for wireless high-speed data communication in addition to a wireless communication module for carrying out usual audio communication.

As illustrated, a cover unit 2 is disposed not only so as to be able to be opened and closed (vertically rotatable (the arrow A of FIG. 4)) with a first hinge 100 being as a rotation shaft, but also so as to be rotatable (horizontally rotatable (the arrow B of FIG. 1)) with a second hinge 12 serving as a shaft (built-in) being as a rotation shaft with respect to a main body unit 3. The cover unit 2 has a second side switch 4, a first speaker 5, a display device 6, and a second speaker 7, and a built-in antenna 16 for data communication. The second side switch 4 is a rotary switch, and a focus movement in a menu display or the like is executed by detecting a vertical rotation movement, and a decision from a selective menu is made by pressing the center thereof. The display device 6 is composed of a 2.7 inch (240×428 dots) TFT liquid crystal (with a resolution corresponding to QVGA or HVGA) color liquid crystal on which an image in the aspect ratio of 16:9 can be displayed.

The main body unit 3 has a key input unit 8, a first side switch 9, and a microphone 10. The key input unit 8 is composed of a cross key 81 for moving focus at the time of displaying a menu, an enter key 82 for making a decision, an address book key 83 for viewing address book data, a network connecting key 84 for instructing a network connection, a movie playback key 85 for starting a movie playback mode, a mail key 86 for starting a mail mode (receiving, preparing, editing, transmitting), an off-hook key 87, a clear key 88 (detecting cancellation) an on-hook key 89 (all-clear: instruction to jump to an incoming call stand-by state), and a ten key 810 for inputting telephone numbers and letter symbols, or the like. The first side switch 9 functions as a manner key in a stand-by state, and functions as a shutter key in a camera mode.

The built-in antenna 16 and a main antenna 11 are in a positional relationship effective in carrying out space diversity receiving in both of the states in which the cover unit 2 is rotated and is closed.

Figure 3:
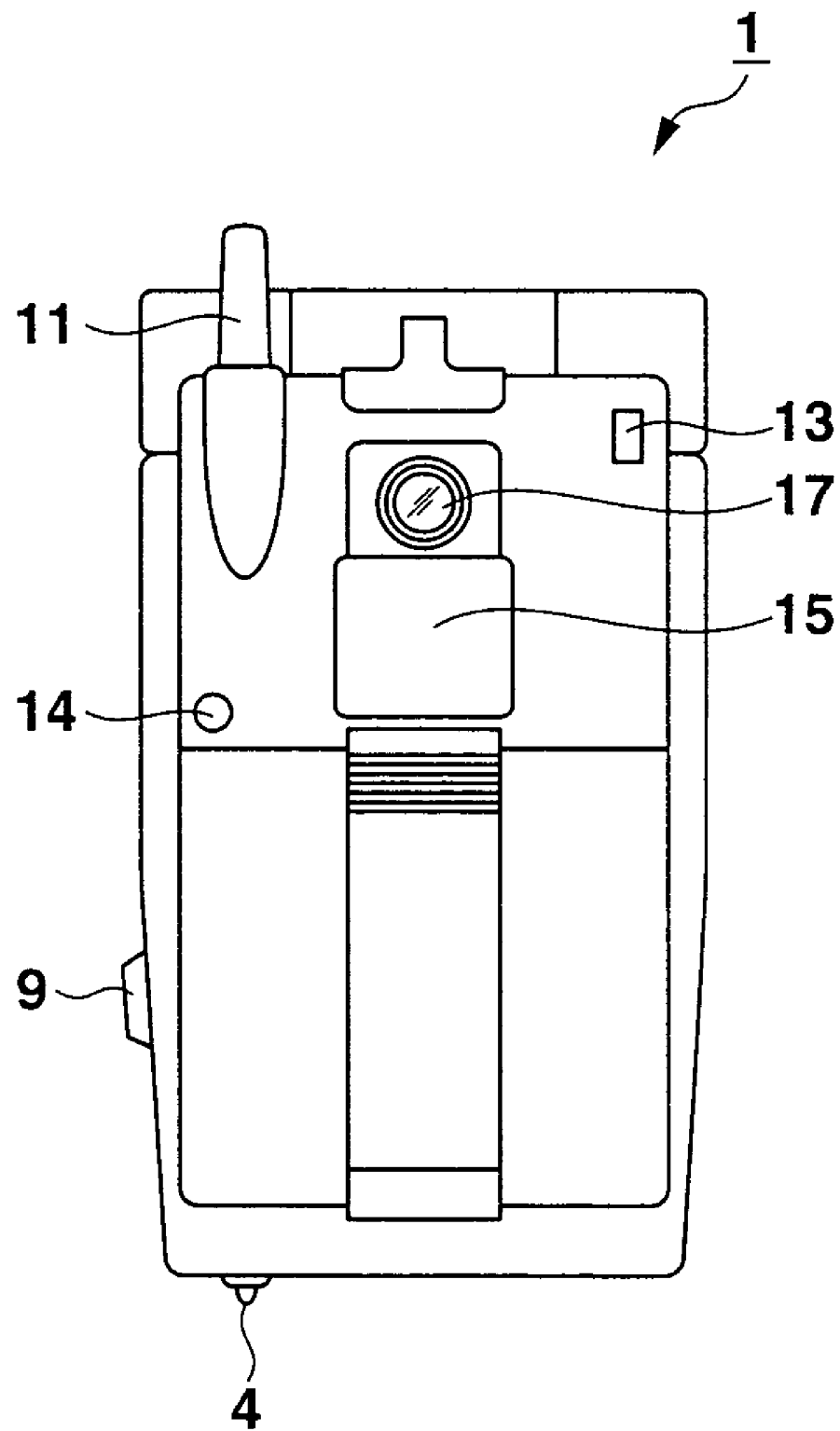
FIG. 3 is a rear view in a state in which a lens barrier is opened.

FIG. 2A is a diagram showing a state in which the cover unit 2 is folded so as to be a form in which the display device 6 and the key input unit 8 are made to face one another. The main antenna 11 is expandable. In FIG. 2B, reference numeral 13 denotes an informing LED, reference numeral 14 denotes an informing speaker, and reference numeral 15 denotes a lens barrier which can be slid in the direction of the arrow. When the lens barrier 15 is slid in the direction of the arrow, as shown in FIG. 3, an image-pickup lens 17 is exposed, and the portable telephone is switched to be in the camera mode.

Figure 4:
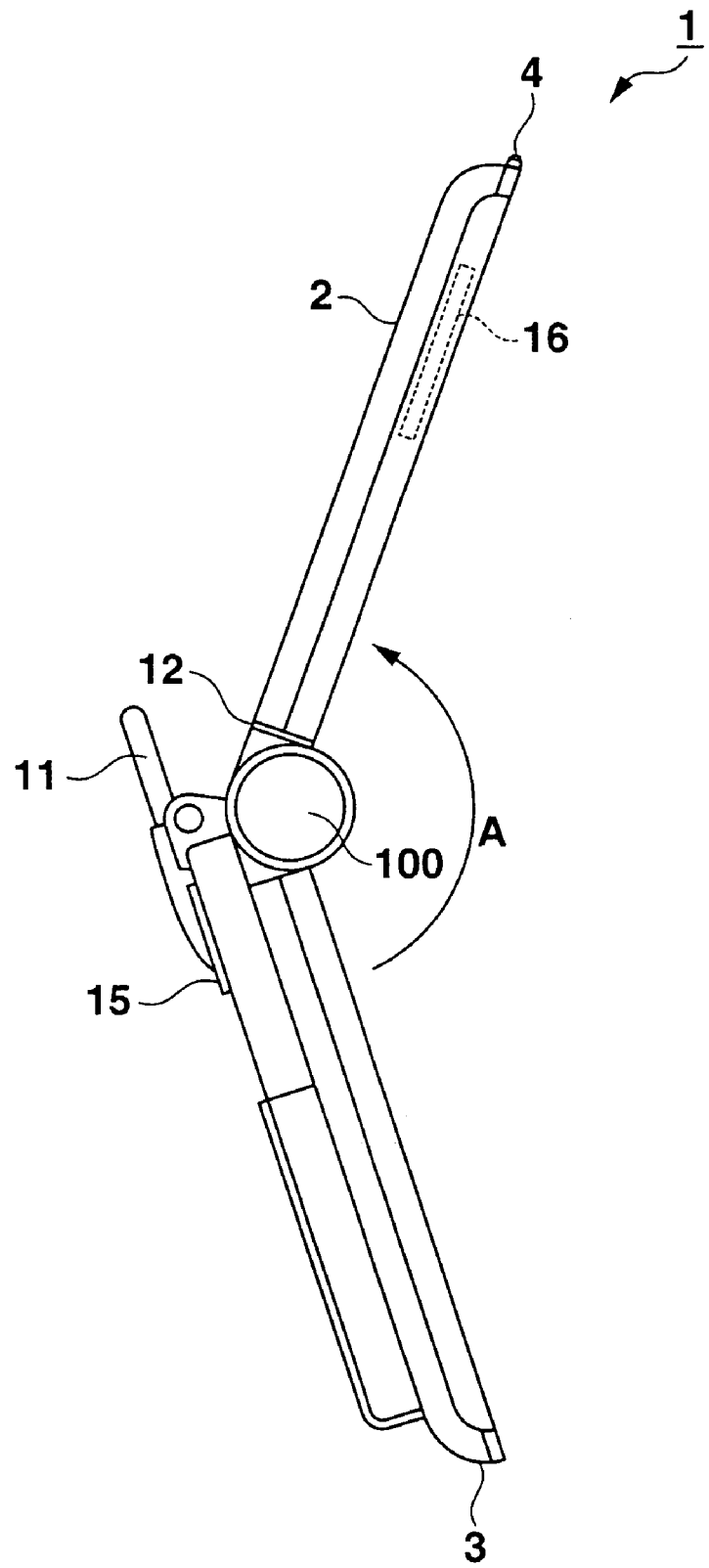
FIG. 4 is a side view in a state in which a cover thereof is opened.

FIG. 4 is a diagram showing a state in which the portable telephone 1 is looked from the side, and a sensor (a first angle detecting unit 28 which will be described later) for detecting that the cover unit 2 is opened a predetermined angle A (for example 120°) or more is built in the first hinge unit 100. A sensor (a second angle detecting unit 29 which will be described later) for detecting that the cover unit 2 is rotated a predetermined angle B (for example 120°) or more built in the second hinge unit 12.

Figure 5:
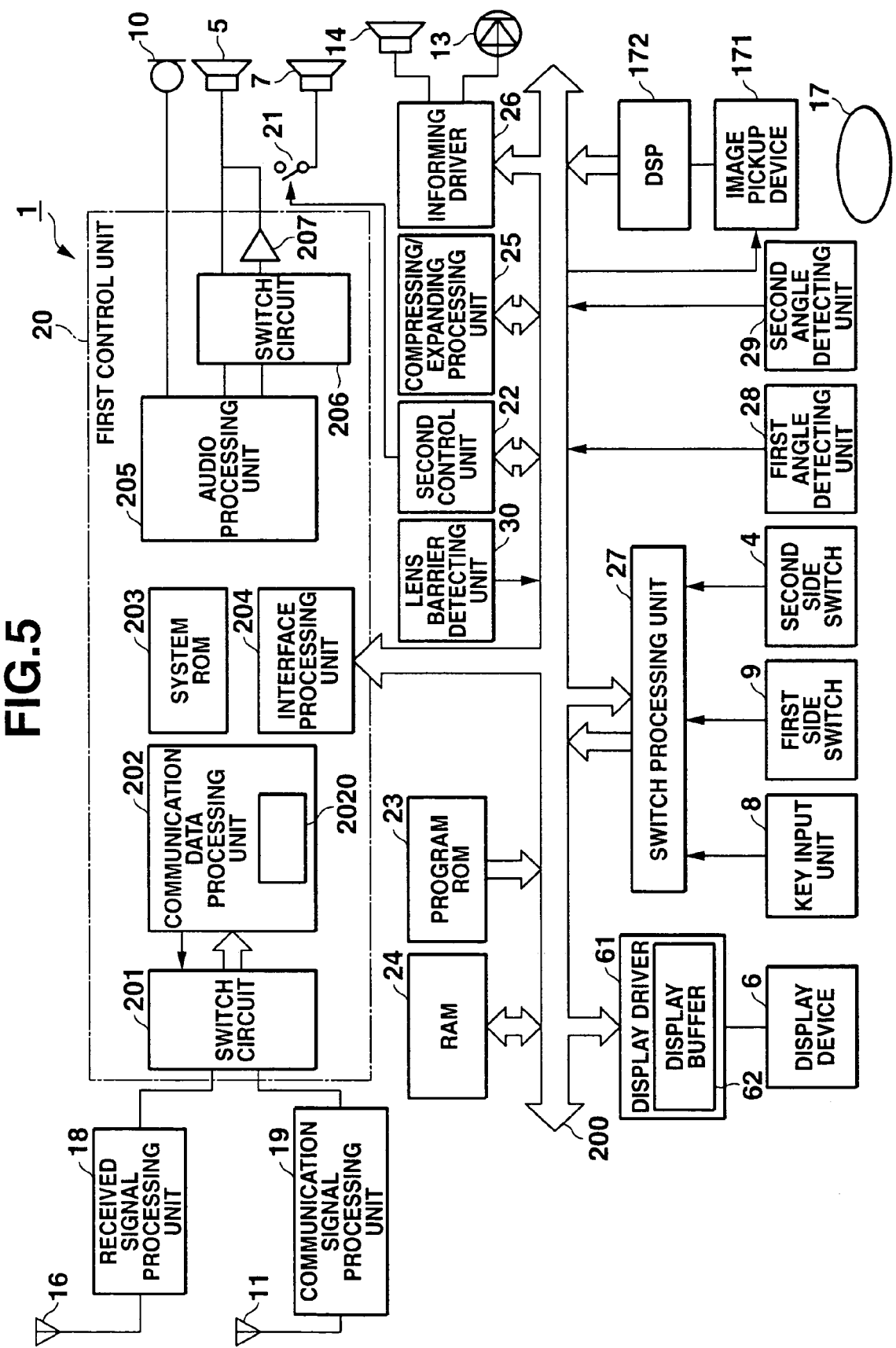
FIG. 5 is a block diagram showing a circuit configuration of the portable telephone.

FIG. 5 is a block diagram showing a circuit configuration of the portable telephone 1. When a received signal processing unit 18 receives an instruction to start the data communication mode from a switch circuit 201, the received signal processing unit 18 starts negotiations (terminal authenticating, line connecting) with an external wireless base station, and carries out processing which temporarily occupies the communication bandwidth. The received signal processing unit 18 extracts a signal which is code-modulated with reference to the self-device from radio signals received by the built-in antenna 16, and outputs the extracted signal to a communication data processing unit 202 via the switch circuit 201.

A power source is always supplied to a communication signal processing unit 19 in both of the stand-by state and the wireless high-speed data communication mode. The communication signal processing unit 19 code-modulates digital modulated signals (transmitted audio data, mail data, and packet data including network connecting information) from the communication data processing unit 202, and outputs the code-modulated signals from the main antenna 11. The communication signal processing unit 19 extracts a signal which is code-modulated with reference to the self-device from radio signals received by the main antenna 11, and outputs the extracted signal to the communication data processing unit 202 via the switch circuit 201.

A first control unit 20 carries out processings centering on the connection control with information resources such as a wireless base station, a communication service provider, a database connected via a network infrastructure such as the Internet or the like, or the like which are the succeeding stages of the wireless base station. In the present embodiment, the portable telephone 1 has two control units, and general communication processings are carried out in the first control unit 20, and the other photographing processing, image processing, and playback processing for videos are carried out in a second control unit 22 which will be described later.

The switch circuit 201 receives a control signal from the communication data processing unit 202, and carries out the control of power source supply to the received signal processing unit 18 and the communication signal processing unit 19, and starting and terminating a processing operation. In detail, usually, in a power source ON-state, or a receiving ON mode state, the switch circuit 201 supplies the power source to only the communication signal processing unit 19 to operate. On the other hand, when a user operates the network connecting key 84, or a start of the data communication mode is instructed in accordance with a schedule set in advance, the received signal processing unit 18 and the communication signal processing unit 19 are operated.

The communication data processing unit 202 modulates digital audio data of CELP system output from an audio processing unit 205 into a signal of PSK system and a diffused code, and carries out the processing in which the code-modulated signals received at the received signal processing unit 18 and the communication signal processing unit 19 are decoded into digital signals of PSK system and/or QAM system. An ID memory 2020 stores intrinsic information which is allocated for the portable telephone 1 in advance for connecting to a wireless base station, a communication service provider, and the Internet. The information includes, for example, a service code allocated to each service provider, a telephone number for accessing to the portable telephone 1, a maker code of the portable telephone 1, an IP address for connecting to the Internet, and a mail address.

A system ROM 203 stores a control program for communication control. As the feature of the present embodiment, the system ROM 203 stores, in addition to a usual communication negotiation program, an operation switching control program for the received signal processing unit 18 and the communication signal processing unit 19. When a start of the data communication mode is instructed, space diversity receiving is carried out by the main antenna 11 and the built-in antenna 16, and by temporarily occupying the communication bandwidth, the code-modulated signals output from both of the received signal processing unit 18 and the communication signal processing unit 19 are substantially simultaneously decoded and synthesized into the digital signals of QAM system (in the present embodiment, video contents compressed into MPEG-2 and MPEG-4 specifications), and are output to a bus 200 via an interface processing unit 204.

The audio processing unit 205 has both of an audio modulating/demodulating function of CELP system and an audio demodulating function of MPEG audio system.

The switch circuit 206 carries out processings in which, in accordance with processings which will be described later, an analog audio output from the audio processing unit 205 is output from the first speaker 5 in a voice communication, and an audio signal stored in a movie file is output from the first speaker 5 via an audio amplifier 207 in a movie playback mode which will be described later.

A switch 21 outputs audio signals to both of the first speaker 5 and the second speaker 7 under the control from the second control unit 22 when the audio data stored in the movie file are stereophonic system.

The second control unit 22 carries out the control of playback-display processing of a movie file downloaded by the data communication mode in the movie playback mode, and still picture/moving picture in the camera mode, and of general photographing processing in the camera mode. Note that, in the present embodiment, concurrent processing with the first control unit 20 described above is possible at the time of incoming call interruption due to a portable telephone function. An interface processing unit 204 carries out interruption processing of address/data to the bus 200 accompanying these processings.

A program ROM 23 stores various processing programs for the movie playback mode, the camera mode, or the like which will be described later, and stores a control program of a display driver 61 which particularly relates to the main subject of the present embodiment, and which is for carrying out the control of write start/end addresses onto a display buffer 62 which will be described later, and the control program is appropriately loaded into the second control unit 22 by an operation of the user.

Figure 6:
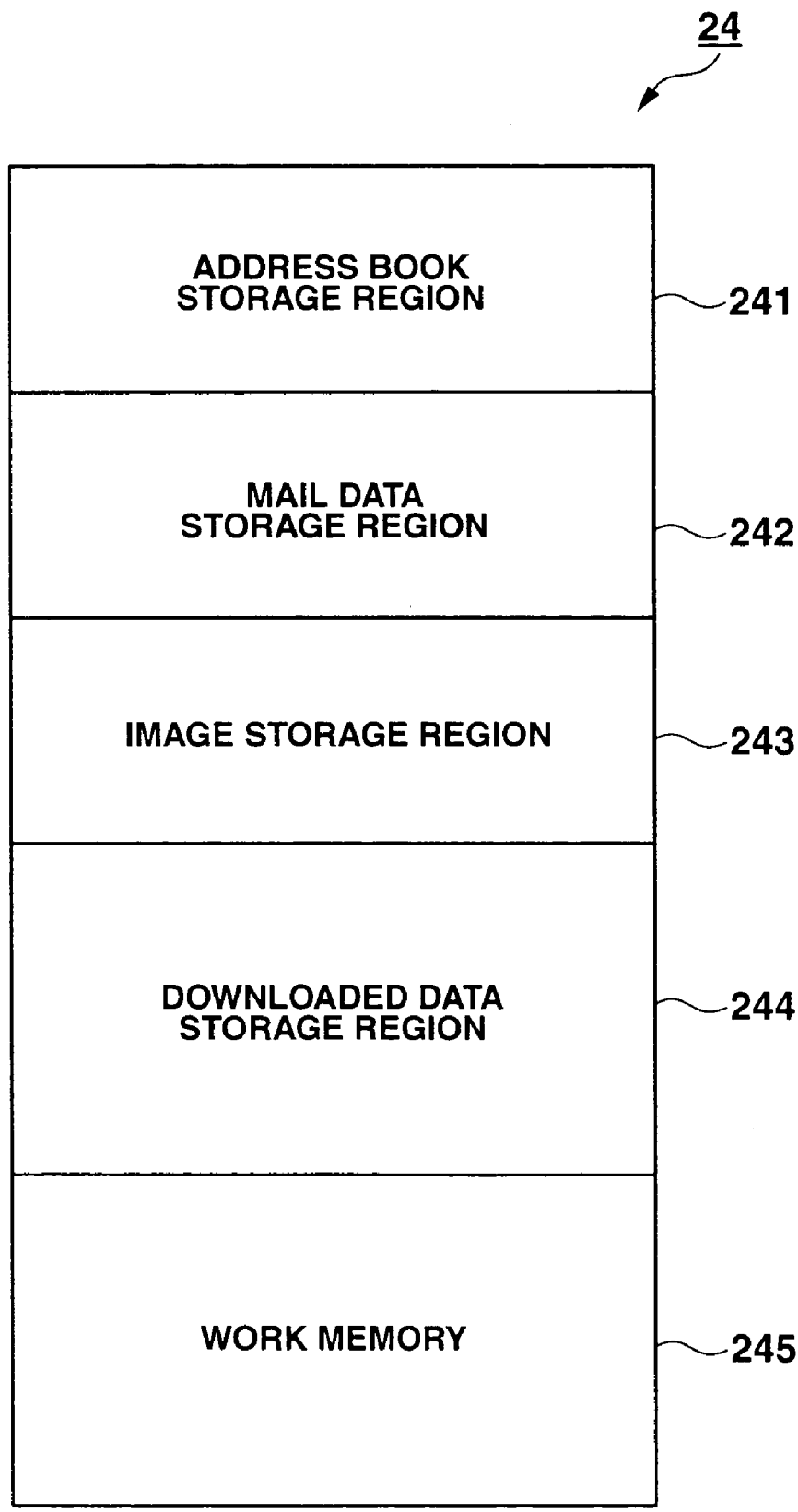
FIG. 6 is a memory block diagram of a RAM.

A RAM 24 stores various data required for data communication processing and audio communication. In detail, as described in FIG. 6, the RAM 24 has the respective regions of an address book storage region 241 in which a telephone number, a mail address, an address, and an intrinsic image (a picture, or an illustration) are stored so as to be associated with one another, a mail data storage region 242 in which mail data transmitted and received through mail communication are stored, an image storage region 243 in which pictures (still picture, moving picture) attached to a mail and pictures (still picture/moving picture) photographed in the camera mode are stored in a state of being compressed, a downloaded data storage region 244 in which a compressed multimedia file (illustration, still picture, moving picture (including picture of an aspect ratio of 16:9), melody, audio) that is received through a network connection is stored, and a work memory 245 for being temporarily used at the time of compressing-processings and expanding-processings for various files.

A compressing/expanding processing unit 25 corresponds to MPEG-2 and MPEG-4 specifications, and compressing-processes the still picture/moving picture photographed in the camera mode, and expanding-processes the movie file downloaded by the data communication mode in the movie playback mode, or the still picture/moving picture in the camera mode.

An informing driver 26 operates an informing LED 13 and an informing speaker 14 for informing the incoming call processing at the time of detecting incoming call processing. A switch processing unit 27 outputs control signals to the first control unit 20 and the second control unit 22 in response to the detection of the operations from the key input unit 8, the first side switch 9, and the second side switch 4. In accordance with detection signals from the first angle detecting unit 28, the second angle detecting unit 29, and a lens barrier detecting unit 30 which will be described later, the informing driver 26 receives signals for turning on and off the detection of the operations of the key input unit 8, the first side switch 9, and the second side switch 4 and for changing functions of the key input unit 8, the first side switch 9, and the second side switch 4 and controls the functions of these keys and switches.

The first angle detecting unit 28 detects an opened and closed angle between the cover unit 2 and the main body unit 3 illustrated in FIG. 4, and outputs the angle to the second control unit 22. The second angle detecting unit 29 detects a relative rotation angle between the cover unit 2 and the main body unit 3 illustrated in FIG. 1, and outputs the angle to the second control unit 22. The lens barrier detecting unit 30 detects an opening and closing state of the lens barrier 15 illustrated in FIG. 2B and FIG. 3, and outputs the state to the second control unit 22.

An image pickup device 171 composed of an image sensor such as a CCD, a CMOS, or the like, and a step motor for optical zooming, and a DSP (digital signal processor) 172 which is for generating image data by converting an analog signal picked up at the image pickup device 171 into a digital signal are provided in the rear of the camera lens 17. In the present embodiment, an effective pixel region of the image sensor is fixed to an aspect ratio of 4:3.

Figure 7:
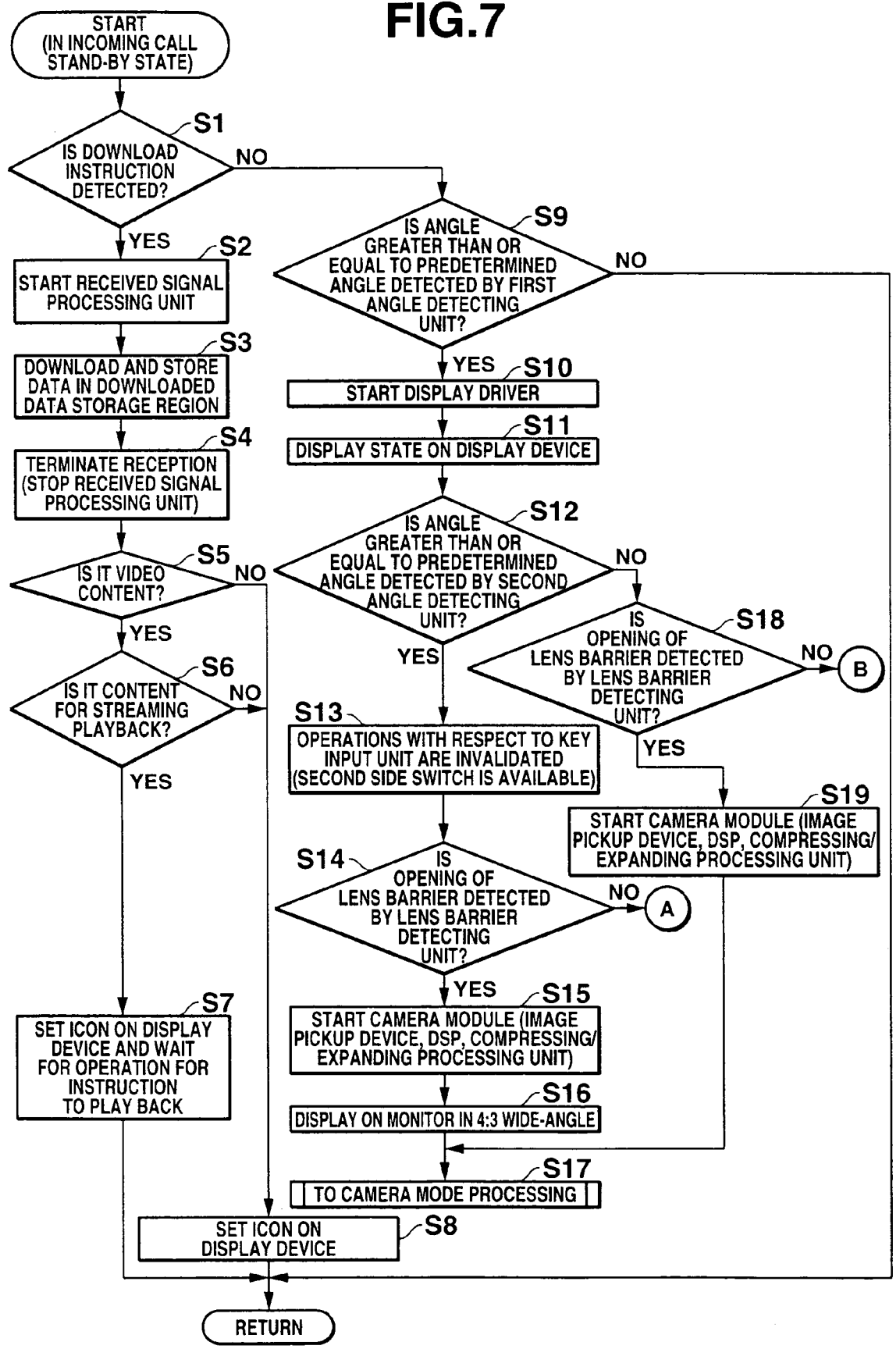
FIG. 7 is a flowchart showing entire processing procedures.

In the present embodiment having the above configuration, when the portable telephone 1 is in an incoming call stand-by state, the first control unit 20 executes processings in steps S1 through S8 in the flowchart of FIG. 7 based on the program stored in the system ROM 203. It is determined whether or not a download instruction is detected (step S1). The download instruction means, not only the case in which the user carries out a download instruction by a manual operation by operating the network connecting key 84, but also the case in which, due to a downloading start time and an address (URL) being registered with schedule data in advance, the data communication mode is instructed to start, for example, in the middle of night.

When the download instruction is detected, the received signal processing unit 18 is operated (step S2). The portable telephone 1 is connected to a network via the received signal processing unit 18, and a compressed multimedia file (illustration, still picture, moving picture (including an image of aspect ratio of 16:9), melody, audio) which has been received is stored in the downloaded data storage region 244 (step S3). Accompanying the completion of downloading the multimedia file, reception terminating processing is executed, and the received signal processing unit 18 is stopped (step S4).

It is determined whether or not the multimedia file stored in the downloaded data storage region 244 in step S3 is a video content (step S5). When the multimedia file is a video content, it is determined whether or not the video content is a content for streaming playback (a pseudo streaming playback service in which the content is played back once after being downloaded, and is erased thereafter) (step S6). When the video content is a content for streaming playback, an icon denoting that the content for streaming playback is stored in the downloaded data storage region 244 is displayed on the display device 6, and the portable telephone 1 is made to be in a state of waiting for an instruction to play back (step S7). When the determined result in step S5 is a result in which the multimedia file is not a video content, and when the determined result in step S6 is a result in which the video content is not a content for streaming playback, but a content without limit to playback, a predetermined icon different from the icon displayed in step S7 is displayed on the display device 6 (step S8).

As a result of the determination in step S1, when a download instruction is not detected, the second control unit 22 executes switching processings accompanying the detection of the opening and closing states and a relative angle of the cover unit 2 and the main body unit 3 in steps S9 through S20 based on the program stored in the program ROM 23. Namely, it is determined whether or not an angle greater than or equal to a predetermined angle is detected by the first angle detecting unit 28 (step S9). As shown in FIG. 4, when the cover unit 2 is made to have an angle greater than or equal to the predetermined angle with respect to the main body unit 3 due to the cover unit 2 being opened, the display driver 61 is started (step S10), and a state display such as displaying a stand-by screen on the display device 6, or the like is carried out (step S11).

It is determined whether or not an angle greater than or equal to the predetermined angle is detected by the second angle detecting unit 29 (step S12). The second angle detecting unit 29 is a sensor for detecting a relative rotation angle of the cover unit 2 with respect to the main body unit 3 as described above. Accordingly, when both of the determination in step S12 and the determination in step S9 described above are YES, the cover unit 2 is horizontally rotated after being opened, and in accordance therewith, as shown in FIG. 11, the cover unit 2 stands up on the main body unit 3, and the display device 6 of the cover unit 2 is made to be in a state of facing the outer surface side of the main body unit 3 on which the lens barrier 15 and the image pickup lens 17 are disposed.

Figure 11:
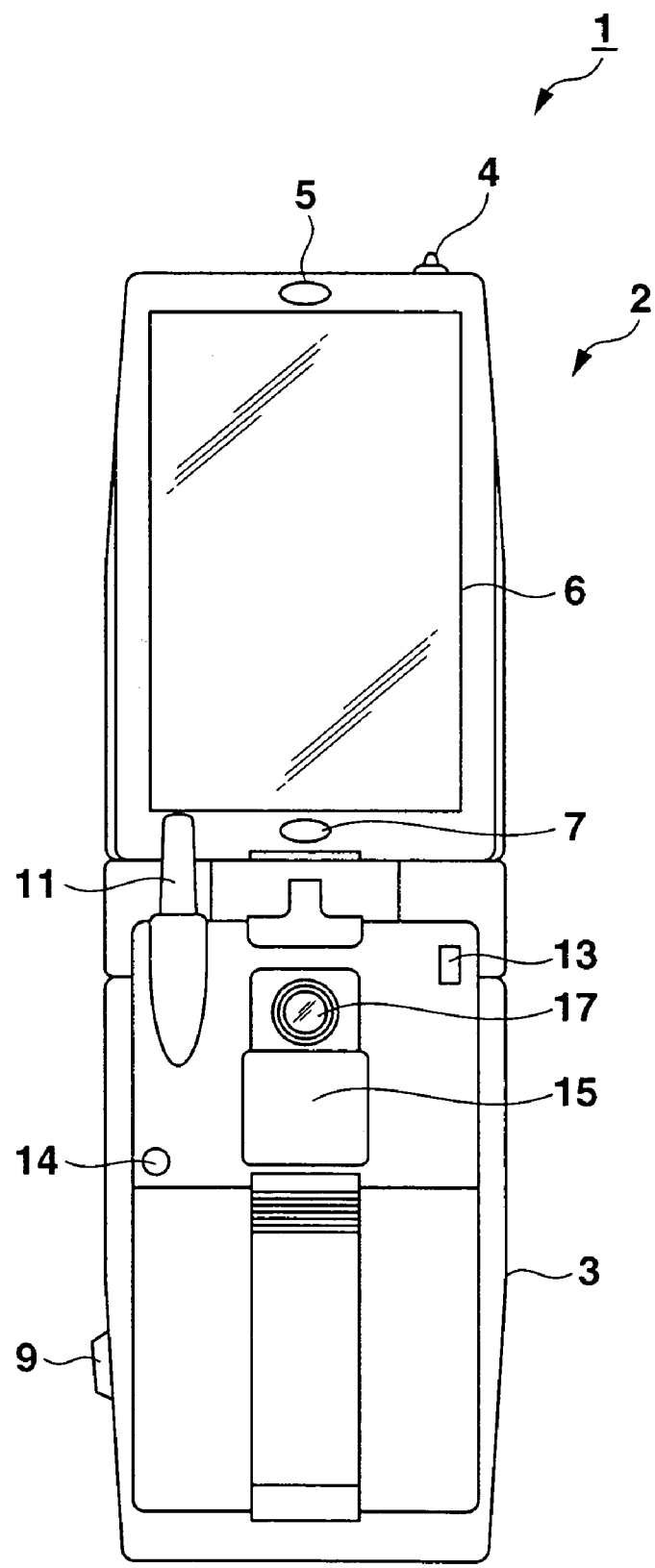
FIG. 11 is a diagram showing a state of the portable telephone in a case in which it is determined YES in step S12 in the flowchart of FIG. 7.

When the display device 6 of the cover unit 2 is in the state shown in FIG. 11, the portable phone 1 is made to be in a state in which operations with respect to the key input unit 8 (the cross key 81, the enter key 82, the address book key 83, the network connecting key 84, the movie playback key 85, the mail key 86, the off-hook key 87, the clear key 88, the on-hook key 89, and ten key 810) are invalidated, and is maintained to be in a state in which an operation of the second side switch 4 becomes effective (step S13). Namely, in order to prevent from operational errors, the portable phone 1 is made to be in a state in which all the operations with respect to the key input unit 8 are invalidated, and on the other hand the operation of the second side switch 4 becomes effective.

It is determined whether or not opening of the lens barrier 15 is detected by the lens barrier detecting unit 30 (step S14), and when opening of the lens barrier 15 is not detected, the routine proceeds to step S21 which will be described later. However, as shown in FIG. 11, when the lens barrier 15 is opened, and this is detected by the lens barrier detecting unit 30, a camera module composed of the image pickup device 171, DSP 172, and compressing/expanding processing unit 25 is started (step S15).

Figure 12:
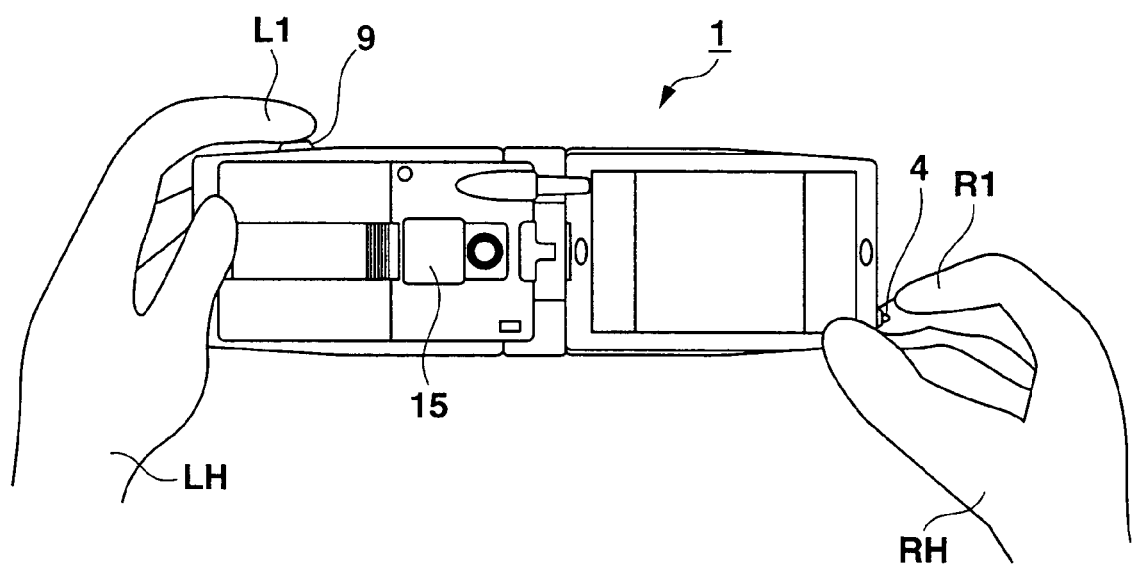
FIG. 12 is a diagram showing a case in which a user holds the portable telephone in the state of FIG. 11 by his/her both hands.

In this way, in a state in which both of the display device 6 and the image pickup lens 17 are positioned at the same surface side, a photographing form of the so-called self-photographing in which a user photographs the user himself/herself can be assumed. Namely, as shown in FIG. 12, it can be assumed that the portable telephone 1 is held with the both hands LH and RH so as to keep the portable telephone 1 with the longer side at the top, and a shutter operation is carried out with the left forefinger L1 (an operation of the first side switch 9) in order to carry out self-photographing, and various setting operations are carried out with the right forefinger R1 (operations with respect to the second side switch 4). Therefore, an object image is displayed in a wide angle on the display device 6 (step S16), and camera mode processing is started (step S17). As described above, because the effective pixel region of the image sensor is fixed to the aspect ratio of 4:3, the object image is displayed on the display device 6 in the aspect ratio of 4:3 in step S16.

On the other hand, as a result of the determination in step S12, when an angle greater than or equal to the predetermined angle is not detected by the second angle detecting unit 29, as shown in FIG. 1, the cover unit 2 is merely opened. In this case, the display device 6 faces the side opposite to the surface of the main body unit 3 on which the image pickup lens 17 is disposed, and the usual photographing form in which a user photographs an object other than the user himself/herself is assumed. Therefore, it is determined whether or not opening of the lens barrier 15 is detected by the lens barrier detecting unit 30 (step S14), and when opening of the lens barrier 15 is not detected, the routine proceeds to step S24 which will be described later. However, when the lens barrier 15 is opened, and this is detected by the lens barrier detecting unit 30, the camera module composed of the image pickup device 171, DSP 172, and compressing/expanding processing unit 25 is started (step S20), and camera mode processing is started (step S17).

Figure 8:
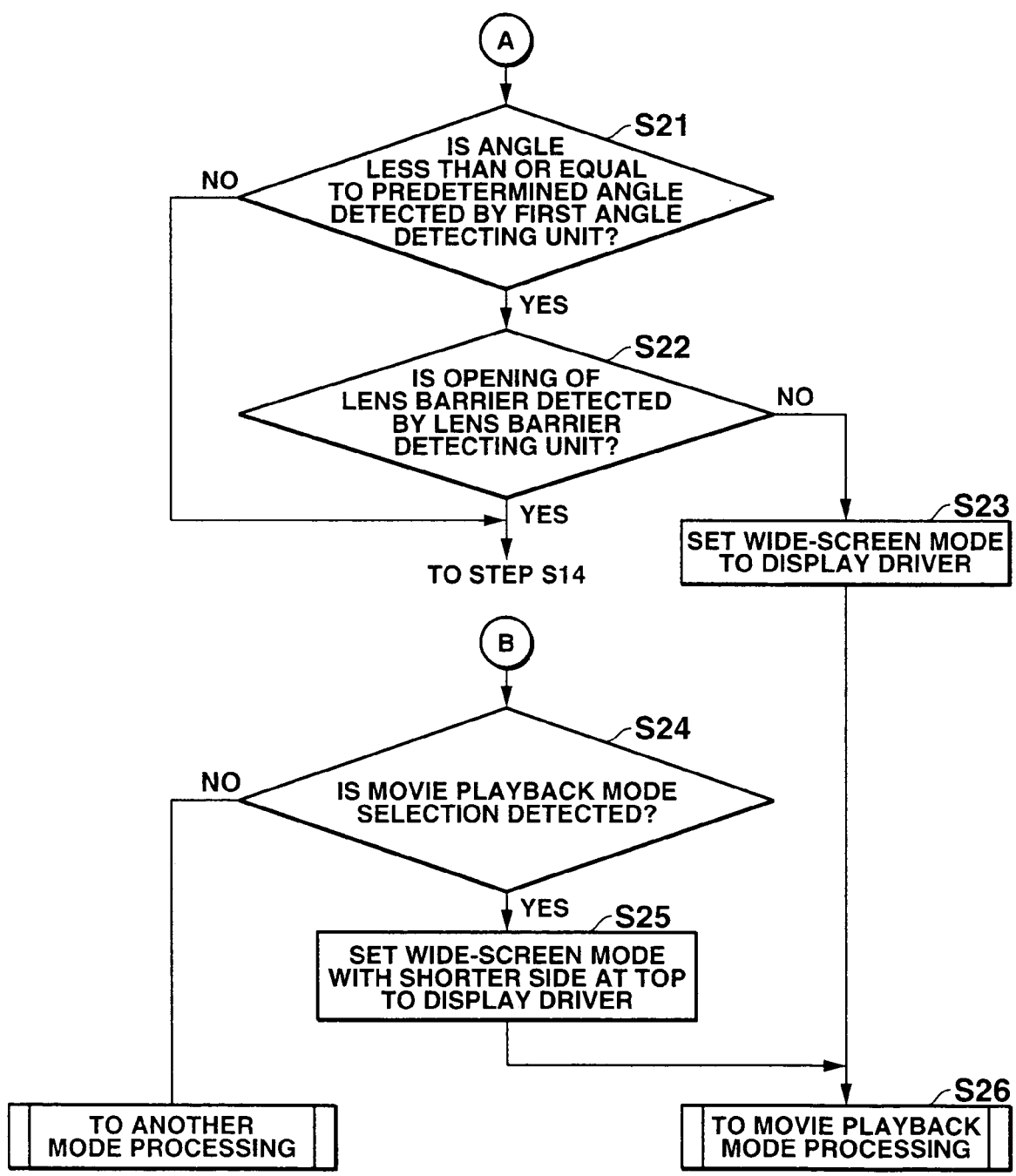
FIG. 8 is a flowchart following the flowchart of FIG. 7.
Figure 13:
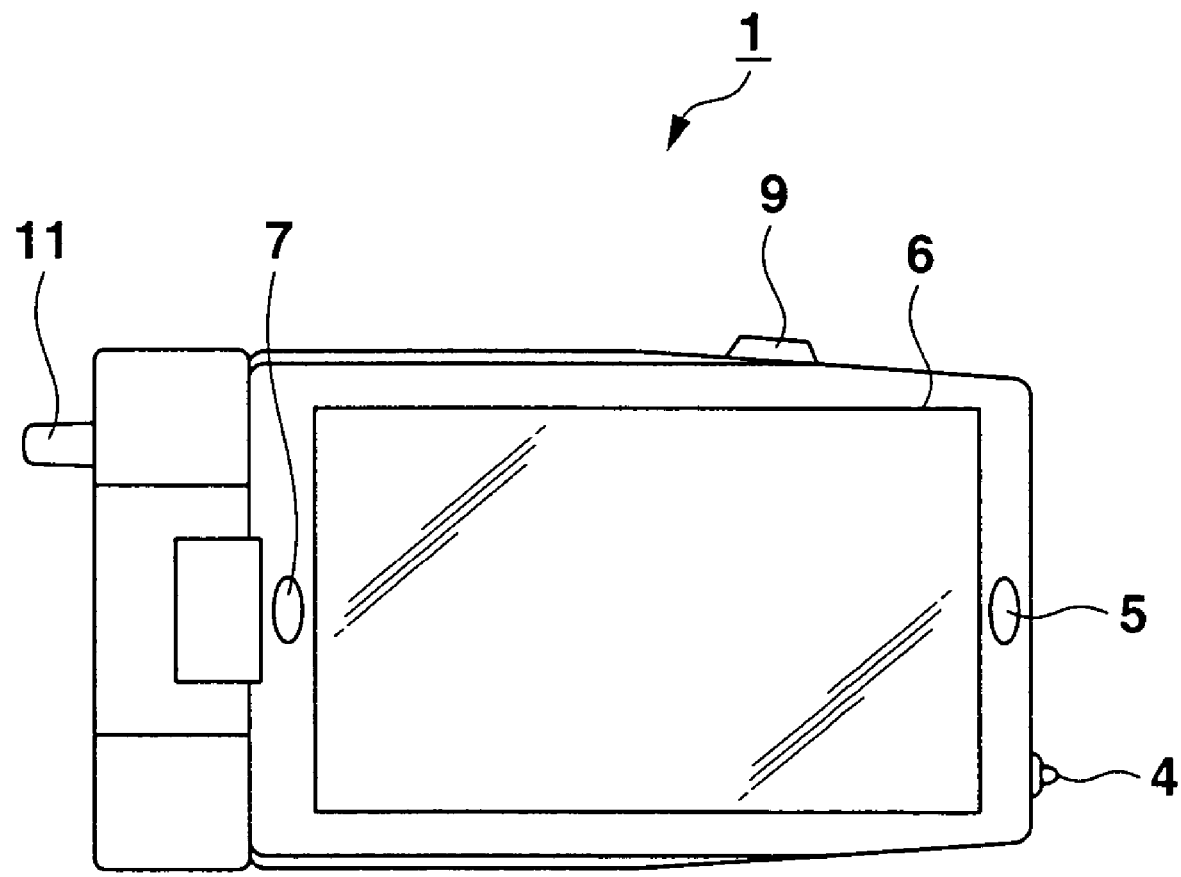
FIG. 13 is an external view of the portable telephone in step S32 of the flowchart of FIG. 9.

On the other hand, when the determination in step S14 is NO, and opening of the lens barrier 15 is not detected, the routine proceeds to the movie playback mode by processings in steps S21 through S23 in FIG. 8. Namely, when the determination in step S14 is NO, the routine proceeds to step S21, and it is determined whether or not an angle less than or equal to the predetermined angle is detected by the first angle detecting unit 28 (step S21). The case in which the determination in step S21 is made to be YES is a state in which, in the state of FIG. 2A, the cover unit 2 is opened and rotated 120° or more with the first hinge 100 being as a shaft (step S9; YES), and the cover unit 2 is rotated 180° with the second hinge 12 being as a shaft (step S12; YES), and the cover unit 2 is closed again (step S21; YES). Or, the case in which the determination in step S21 is made to be YES is a state in which the lens barrier 15 is being closed (step S14; NO). Accordingly, the cover unit 2 is folded so as to make the display device 6 side thereof be the top surface onto the inner surface of the main body unit 3 on which the ten key 810 and the like are provided, and to view this state from the display device 6 side, as shown in FIG. 13, the display device 6, first speaker 5, and second speaker 7 are positioned on the top surface and are made to face the user. The second side switch 4 is made to be available (refer to step S13).

Figure 14A:
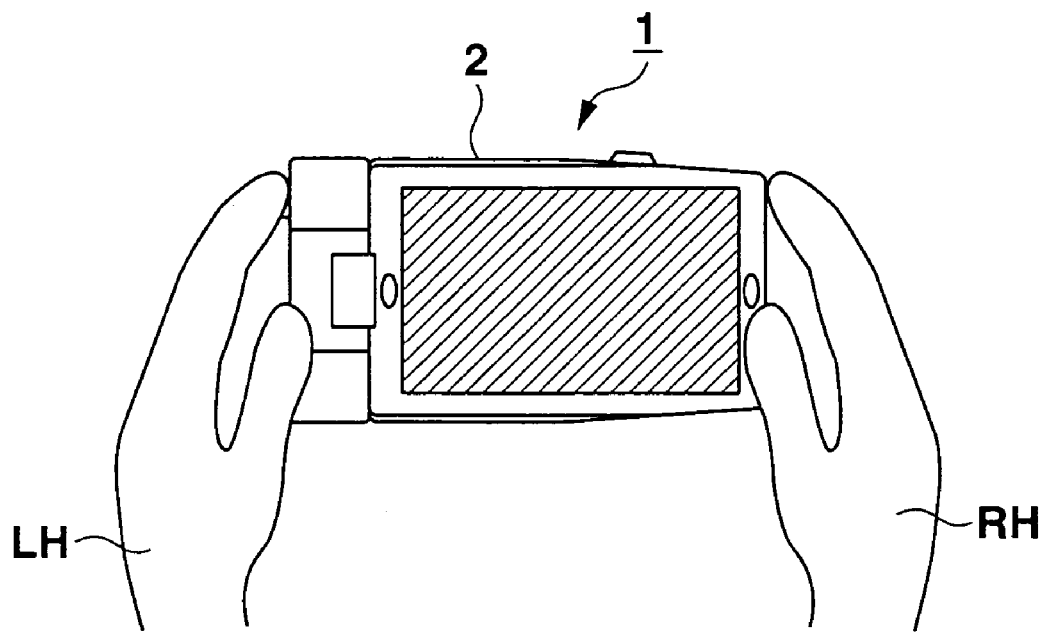
FIG. 14A is a diagram showing a case in which the user holds the portable telephone in a movie playback mode when the portable telephone is in the state of FIG. 13.

When the determination in step S21 is YES, and an angle less than or equal to the predetermined angle is detected by the first angle detecting unit 28, it is determined whether or not opening of the lens barrier 15 is detected by the lens barrier detecting unit 30 (step S22). When opening of the lens barrier 15 is not detected, the user is considered to have no intention to photograph, and a wide screen display is set in the display driver 61 (step S23), and the routine proceeds to the movie playback mode processing (step S26). Accordingly, as shown in FIG. 14A, the user can watch a played-back movie while holding the both end portions of the portable telephone 1 in a state of being folded with the both hands LH and RH so as to keep the display device 6 with the longer side at the top.

Figure 14B:
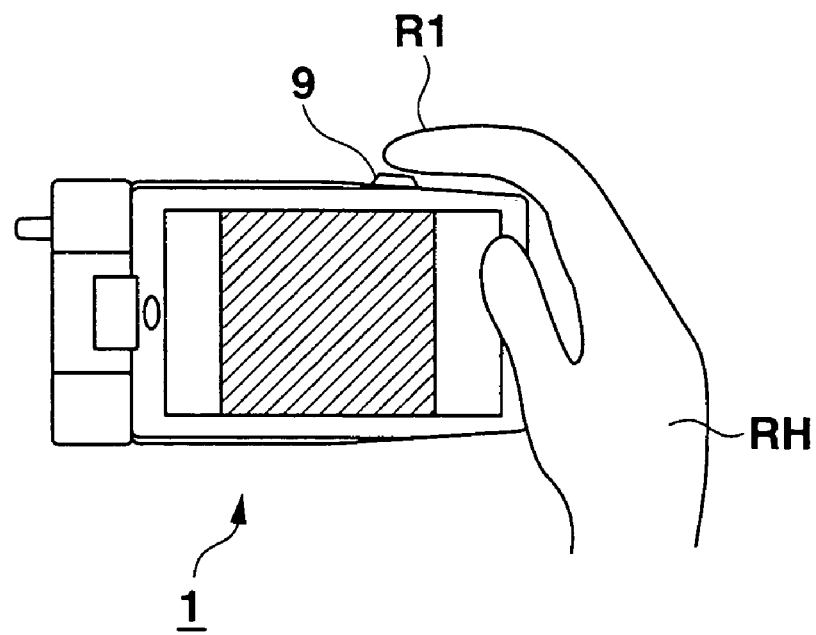
FIG. 14B is a diagram showing a case in which the user holds the portable telephone in a camera mode when the portable telephone is in the state of FIG. 13.

As a result of the determination in step S22, when opening of the lens barrier 15 is detected by the lens barrier detecting unit 30, the routine returns to step S14, the routine proceeds to camera mode processing by the processings in steps S15, S16, and S7 described above. Therefore, in this case, as illustrated in FIG. 14B, the object image is displayed in the aspect ratio of 4:3 on the display device 6, and the user holds the portable telephone 1 with the right hand RH, and can carry out photographing by carrying out a shutter operation (the first side switch 9) with the right forefinger R1.

When the determination in step S18 is NO, and opening of the lens barrier 15 is not detected, the routine proceeds to step S24 of FIG. 8, and it is determined whether or not the movie playback mode is selected (step S24). When the movie playback mode is not selected, the routine proceeds to another mode processing. When the movie playback mode is selected, a wide screen display made to correspond to the direction with the shorter side at the top is set with respect to the display driver 61 (step S25), and the routine proceeds to the movie playback processing in the same way as described above (step S26). Namely, when the determination in step S18 is NO, in the sate of FIG. 2A, the cover unit 2 is merely opened and rotated 120° or more with the first hinge 100 being as a shaft (step S9; YES), and the portable telephone 1 is in the state of FIG. 1. Accordingly, in this case, a movie playback is carried out in a wide screen display made to correspond to the direction with the shorter side at the top.

Figure 9:
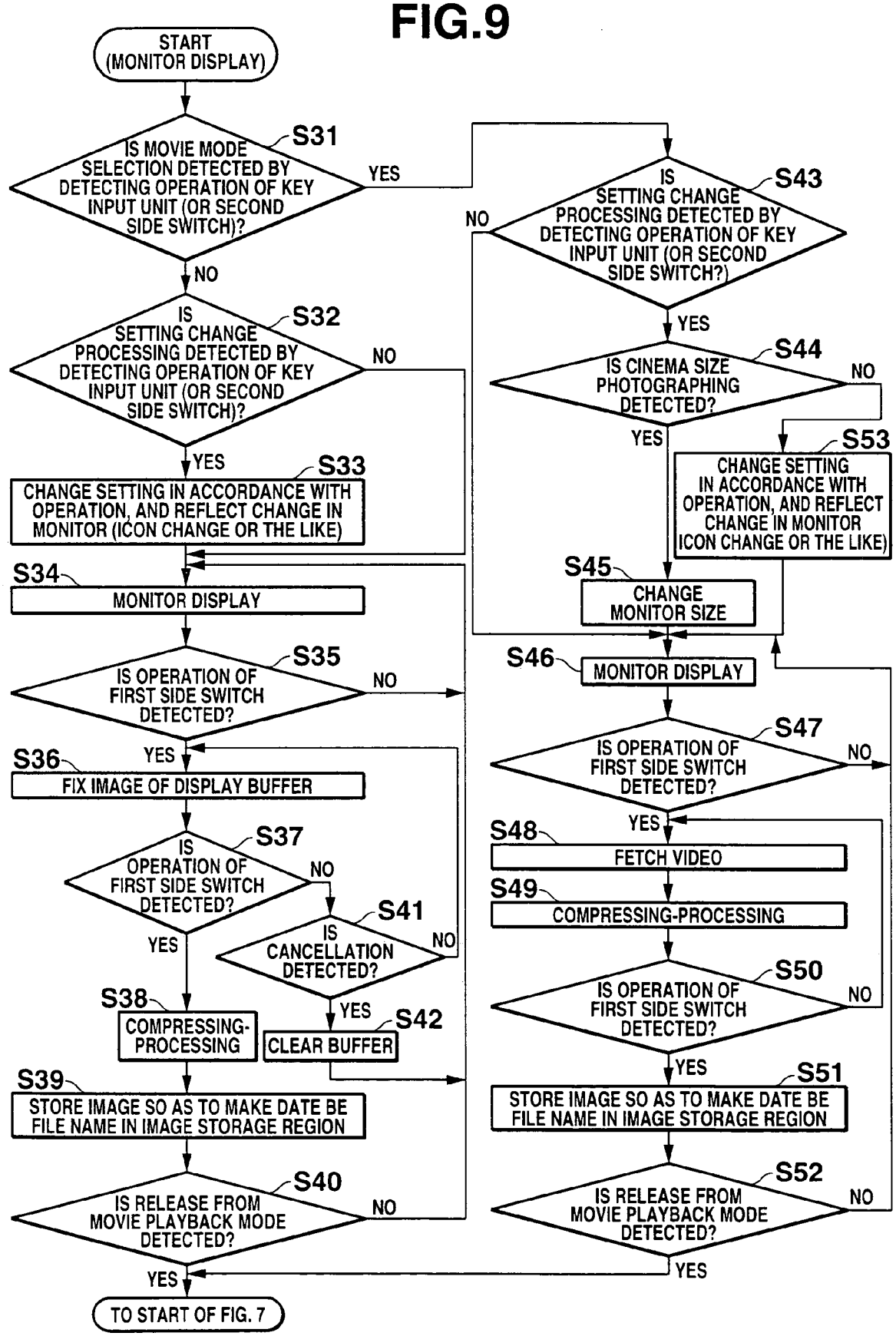
FIG. 9 is a flowchart showing the details of camera mode processing.

FIG. 9 is a flowchart showing the details of camera mode processing (step S7). In this flowchart, steps S31 through S42 show the procedure of still picture photographing processings, and steps S43 through S52 show the procedure of movie photographing processings. First, it is determined whether or not the movie mode selection by the key input unit 8 or the second side switch 4 is detected (step S31). When the selection of movie mode is not detected, it is determined whether or not setting change processing by the key input unit 8 or the second side switch 4 is detected (step S32). When the setting change processing is not detected, the routine proceeds to step S34, and when the setting change processing is detected, a setting change is carried out in accordance with an operation, and the setting change is reflected in the monitor due to the icon displayed on the display device 6 being changed, or the like (step S33). The object image is displayed on the monitor in the aspect ratio of 4:3 as described above (step S34).

Namely, in the state of the camera mode processing, as shown in FIG. 15, the region (240×320 dots) in the aspect ratio of 4:3 on the 2.7 inch (240×428 dots) display device 6 on which an image in the aspect ratio of 16:9 can be displayed is a monitor display area 601 on which the object image is displayed. Accordingly, by effectively utilizing the remaining display regions at the both sides of the monitor display area 601, a self-timer icon 602, photographing mode icon 603, white balance icon (an outdoor light in the display example) 604, Ev (exposure) gage 605, photographing mode display (1600×1200 (dots) which is a resolution corresponding to UXGA in the display example) 606, zoom indicator (it is possible to enlarge up to 48 magnifications which is the product of 3 and 16 in which optical zooming is 3 magnifications and digital zooming is 16 magnifications) 607, receiving state icon 608, battery residual quantity icon 609, movie photographing mode switching icon 610, or the like can be displayed. Therefore, in step S33, these icons and the like 602 through 610 are displayed so as to be changed in accordance with an operation, and in step S34, the object image is displayed on the monitor display area 601.

Accordingly, by using the display device 6 on which an image in the aspect ratio of 16:9 can be displayed, at the time of photographing, there is no case in which the respective icons and the like 602 through 610 are overlapped the object image in the monitor display area 601. Therefore, an angle of view to be photographed can be displayed on a liquid crystal without any obstacle, and photographing setting contents and respective states of the portable telephone 1 can be displayed so as to be easily viewed.

In step S35 following step S34, it is determined whether or not an operation of the first side switch 9 functioning as a shutter key in a camera mode is detected (step S35), and when it is detected, the image data in the display buffer 62 is fixed to image data at a point in time when the first side switch 9 is operated (step S36). Next, it is determined whether or not an operation of the first side switch 9 is detected again (step S37). When the operation of the first side switch 9 is not detected, it is determined whether or not a canceling operation is detected (step S41), and the portable telephone 1 is on standby while repeating the loop of steps S36→S37→S41→S36.

In the meantime, when a canceling operation is detected (step S41; YES), the display buffer 62 is cleared (step S42), and the processings from step S34 are executed again. When the operation of the first side switch 9 is detected again (step S41; YES), the image data fixed in the display buffer 62 is compressed (step S38), and the compressed image data is stored so as to make the date be a file name in the image storage region 243 of the RAM 24 (step S39). Moreover, in accordance with whether or not the lens barrier detecting unit 30 has detected closing of the lens barrier 15, it is determined whether or not a release from a camera mode is detected (step S40), and the processings from step S34 are repeated until the time when a release from a camera mode is detected at step S40, and at a point in time when a release from a camera mode is detected (step S40; YES), the routine returns to the start in the flowchart in FIG. 7.

On the other hand, as a result of the determination in step S31, when the movie mode selection is detected, it is determined whether or not setting change processing by the key input unit 8 or the second side switch 4 is detected (step S43). When the setting change processing is not detected, the routine proceeds to step S46, and when the setting change processing is detected, it is determined whether or not it is the selection of cinema size photographing (step S44). When it is not the selection of cinema size photographing (the selection of normal size photographing as is), due to the icon displayed on the display device 6 being changed, or the like, the setting change is reflected in the monitor (step S53), and the object image is displayed on the monitor in the aspect ratio of 4:3 which is the normal size (step S46).

Namely, in a photographing state which is in a movie mode and in the normal size, as shown in FIG. 16, in the same way as in the case of the camera mode, on the 2.7 inch (240×428 dots) display device 6 on which an image in the aspect ratio of 16:9 can be displayed, the region (240×320 dots) in the aspect ratio of 4:3 becomes the monitor display area 601 on which the object image is displayed. Then, by effectively utilizing the remaining display regions at the both sides of the monitor display area 601 being, a recording elapsed time display 611, Ev (exposure) gage 605, moving picture photographing size icon (four patterns of S, M, L, CINEMA) 612, zoom indicator 607, receiving state icon 608, battery residual quantity icon 609, camera photographing mode switching icon 613, or the like are displayed. In step S53, these icons and the like are displayed so as to be changed in accordance with an operation.

In this way, by using the display device 6 on which an image in the aspect ratio of 16:9 can be displayed, at the time of photographing in the normal size in the movie mode, in the same way as described above, there is no case in which the respective icons and the like are overlapped the object image. As a result, an angle of view to be photographed can be displayed on a liquid crystal display without any obstacle, and the photographing setting contents and the respective states of the portable telephone 1 can be displayed so as to be easily viewed.

As a result of the determination in step S44, when cinema size photographing is selected, the monitor size is changed to the cinema size (step S45), and the object image is displayed on the monitor in the aspect ratio of the cinema size (step S46).

Figure 17:
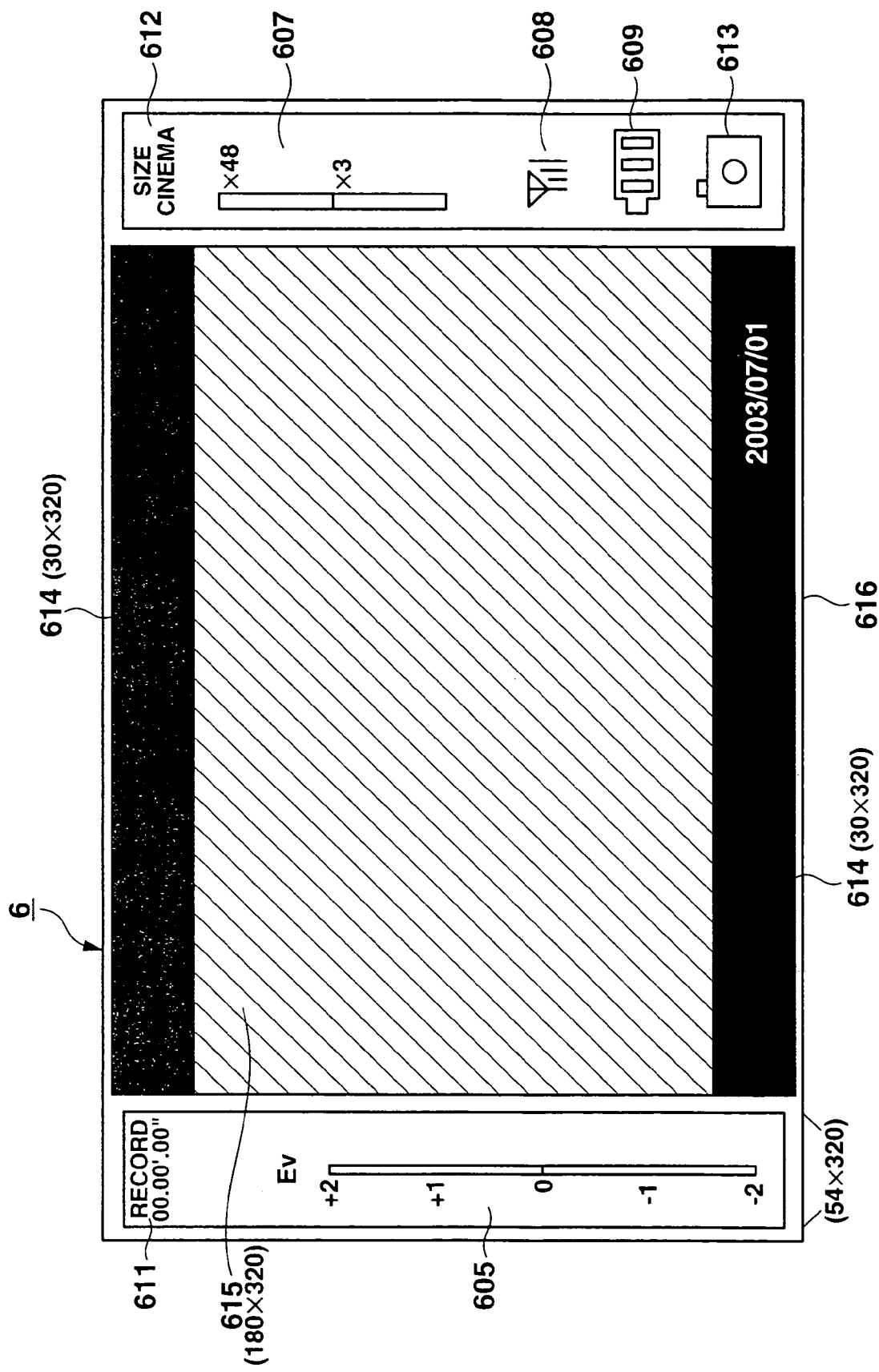
FIG. 17 is a diagram showing a display region in a movie mode (the cinema size)

At that time, an image in the aspect ratio of 16:9 can be displayed on the display device 6, and the effective pixel region of the image sensor in the present embodiment is fixed to the aspect ratio of 4:3 as described above, and a pixel region which can be sensed by the image sensor does not correspond to 16:9. Therefore, in a state of cinema size photographing in a movie mode, as shown in FIG. 17, the effective pixel region in the aspect ratio of 4:3 is divided into a moving picture displaying area 615 (180×320 dots) in the aspect ratio of 16:9 on which the object image is displayed and black pictures 614 ((30×320 dots)×2) at the top and bottom regions other than the moving picture displaying area 615. Accordingly, in the same way as described above, not only the recording elapsed time display 611, Ev (exposure) gage 605, moving picture photographing size icon 612, zoom indicator 607, receiving state icon 608, battery residual quantity icon 609, camera photographing mode switching icon 613, or the like can be displayed due to the remaining display regions at the both sides of the monitor display area 601 being effectively utilized, but also a current date 616 can be displayed by effectively utilizing the black picture 614 portions.

Next, it is determined whether or not an operation of the first side switch 9 is detected (step S47). When it is detected, images are sequentially fetched into the display buffer 62 (step S48), and are compressed (step S49). Until the time when the operation of the first side switch 9 is detected again (step S50), the processings in steps S48 and S49 are repeated. When the operation of the first side switch 9 is detected again (step S50; YES), the moving picture data generated in the display buffer 62 is stored so as to make the date be a file name into the image storage region 243 of the RAM 24 (step S51). Moreover, in accordance with whether or not the lens barrier detecting unit 30 has detected that closing of the lens barrier 15, it is determined whether or not a release from a camera mode is detected (step S51), and the processings from step S46 are repeated until the time when a release from a camera mode is detected, and at a point in time when a release from a camera mode is detected, the routine returns to the start in the flowchart of FIG. 7.

Figure 10:
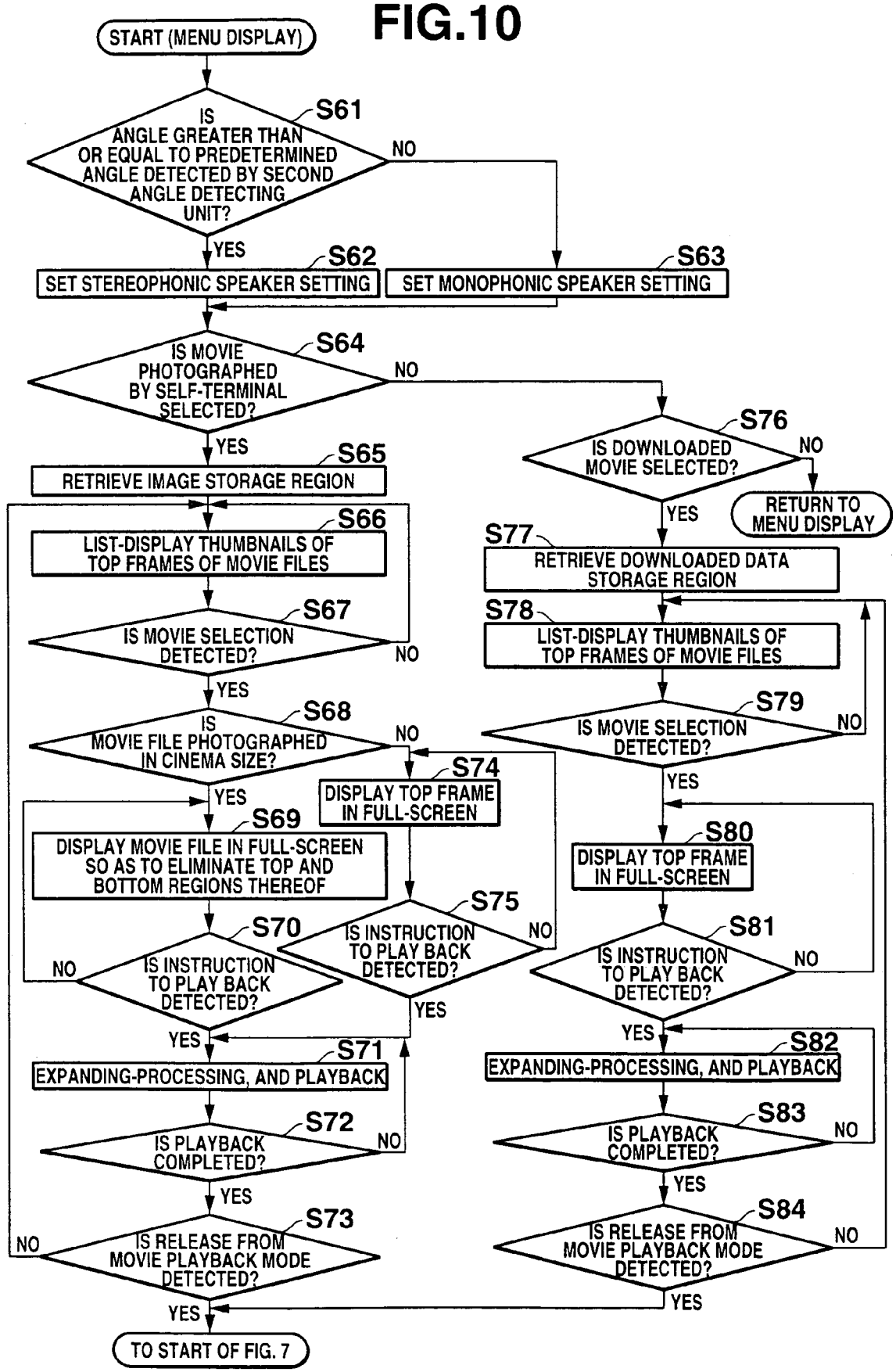
FIG. 10 is a flowchart showing the details of movie playback mode processing.

FIG. 10 is a flowchart showing the details of movie playback mode processing (step S26). In this flowchart, steps S61 through S63 show the procedure of downloaded movie file playing-back processings, and steps S64 (YES determination) through S73 show the procedure of processings in which the file movie-photographed by the self-device is displayed.

At the time of executing movie playback mode processing, it is determined whether or not an angle greater than or equal to the predetermined angle is detected by the second angle detecting unit 29 (step S61). The case in which the determination in step S61 is made to be YES is a state in which, as described above, the cover unit 2 is folded so as to make the display device 6 side thereof be the top surface onto the inner surface of the main body unit 3 on which the ten key 810 and the like are provided, and the lens barrier 15 is closed. Then, this state in the movie playback mode is, as shown in FIG.

14A, the case in which a movie is watched while holding the both end portions of the portable telephone 1 in a state of being folded with the both hands LH and RH so as to keep the display device 6 with the longer side at the top. Then, at the time of playing-back a movie in a case of being in the state of FIG. 14A, because an appropriate stereophonic effect due to sounding from the first and second speakers 5 and 7 is brought about, stereophonic speaker setting for turning the first and second speakers 5 and 7 on is carried out by closing the switch 21 (step S62).

The case in which the determination in step S61 is NO is a case in which the cover unit 2 is merely opened and rotated 120° or more with the first hinge 100 being as a shaft from the state of FIG. 2A (step S9; YES), and the portable telephone 1 is in the state of FIG. 1, and a movie is watched by holding the main body unit 3 so as to keep the display device 6 with the shorter side at the top. However, at the time of playing-back a movie when the portable telephone 1 is in the state of FIG. 1, when the first speaker 5 and the second speaker 7 are turned on, the portable telephone 1 sounds from the upper and lower portions, and because a feeling of that something is wrong is brought about, monophonic speaker setting in which the switch 21 is opened and only the first speaker 5 is turned on is carried out (step S63).

Figure 18:
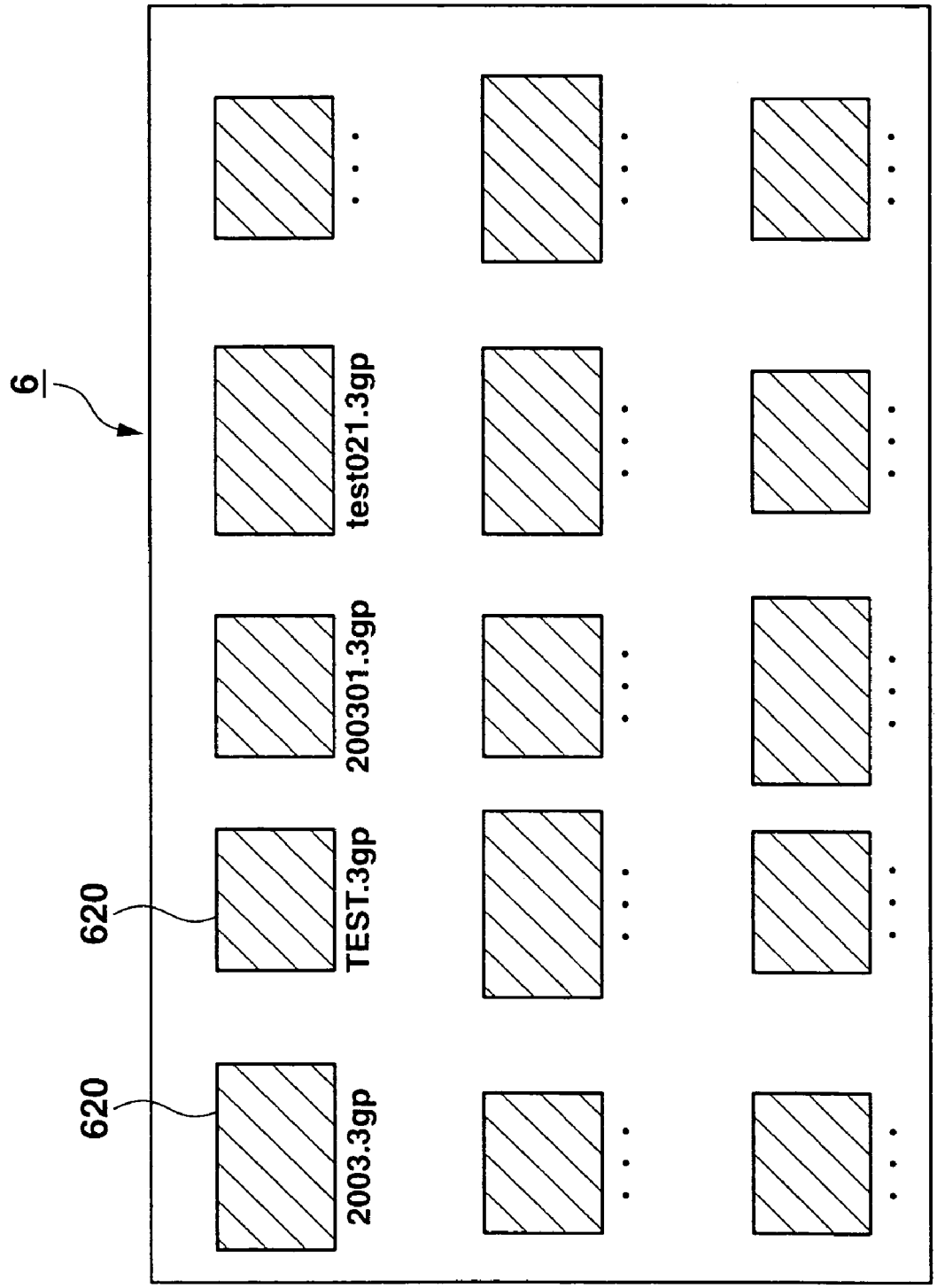
FIG. 18 is a diagram showing a display form in a movie playback mode (thumbnail display)

Next, it is determined whether or not a movie photographed by the self-terminal (the portable telephone 1) by the user is selected (step S64). When the movie photographed by the self-terminal is selected, the image storage region 243 is retrieved (step S65), and the top frames of the movie files stored in the image storage region 243 are list-displayed in thumbnails on the display device 6 (step S66). At that time, because the movie files photographed in the 4:3 size and movie files photographed in the 16:9 size (cinema size photographing) are stored so as to be mixed together in the image storage region 243, thumbnails 620 are displayed in different sizes corresponding to the respective sizes, as shown in FIG. 18. At this time, the top frames of the movie files photographed in the cinema size are made to be thumbnails so as to eliminate the black pictures 614 and to magnify, and as illustrated, the menu is displayed such that the heights of the respective thumbnails 620 to be displayed are made to be equal.

Figure 19:
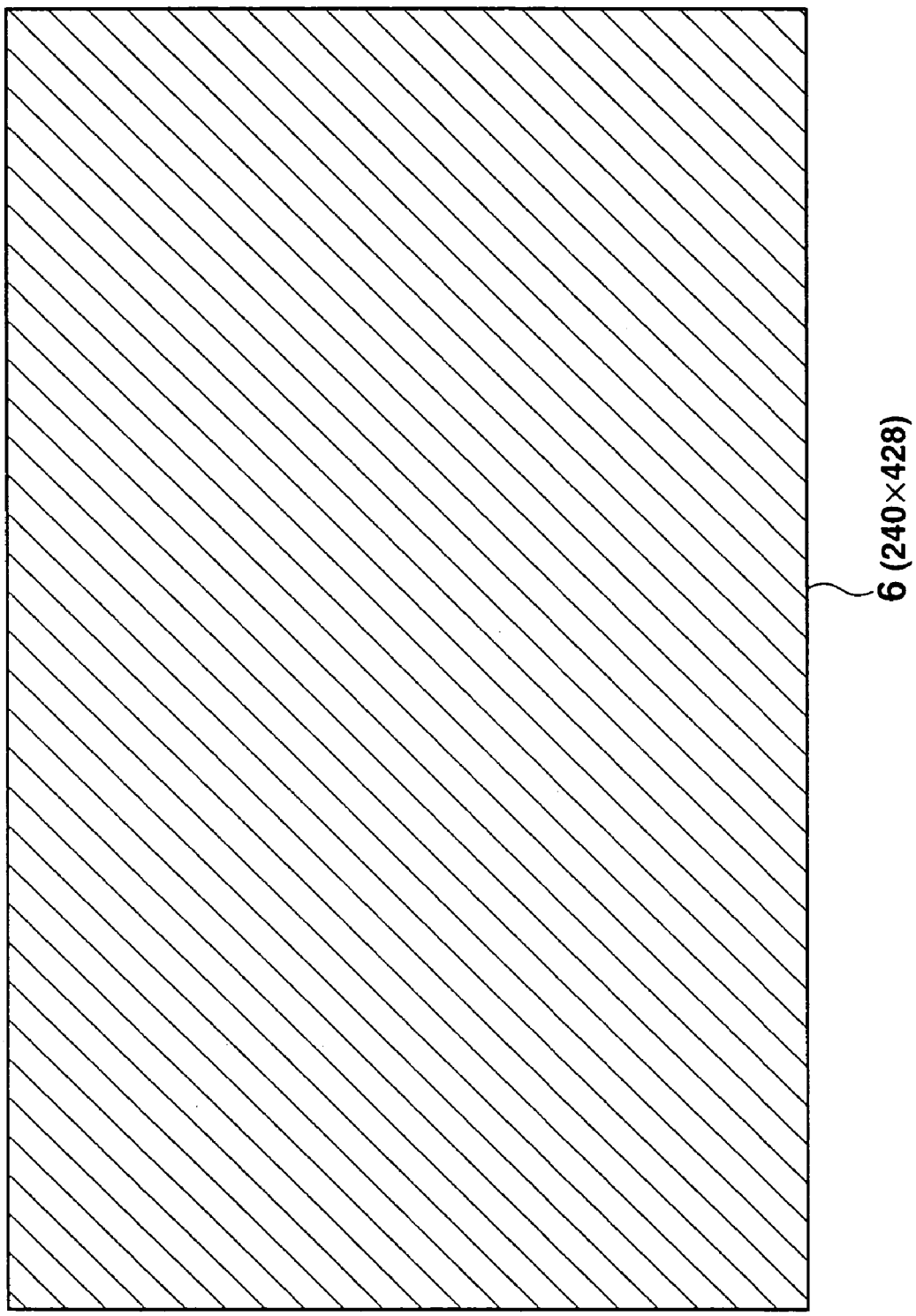
FIG. 19 is a diagram showing a display form in a movie playback mode (full-screen display)

While maintaining the state of displaying the menu shown in FIG. 18, the portable telephone 1 is on standby until the time when one of the movies is selected (step S67). The selection of a movie file to be played back is carried out by a roto-click (rotation) in the vertical direction of the second side switch 4, and when one of the movies is selected, it is determined whether or not the movie is a file photographed in the cinema size (step S68). When the movie is a file photographed in the cinema size, a picture from which the respective black pictures 614 at the top and bottom regions of the movie file are eliminated is displayed in full-screen on the display device 6 (step S69). Accordingly, when the movie file photographed in the cinema size is selected, as shown in FIG. 19, the top frame of the movie frame is fully displayed (240×428 dots) on the display device 6.

Figure 20:
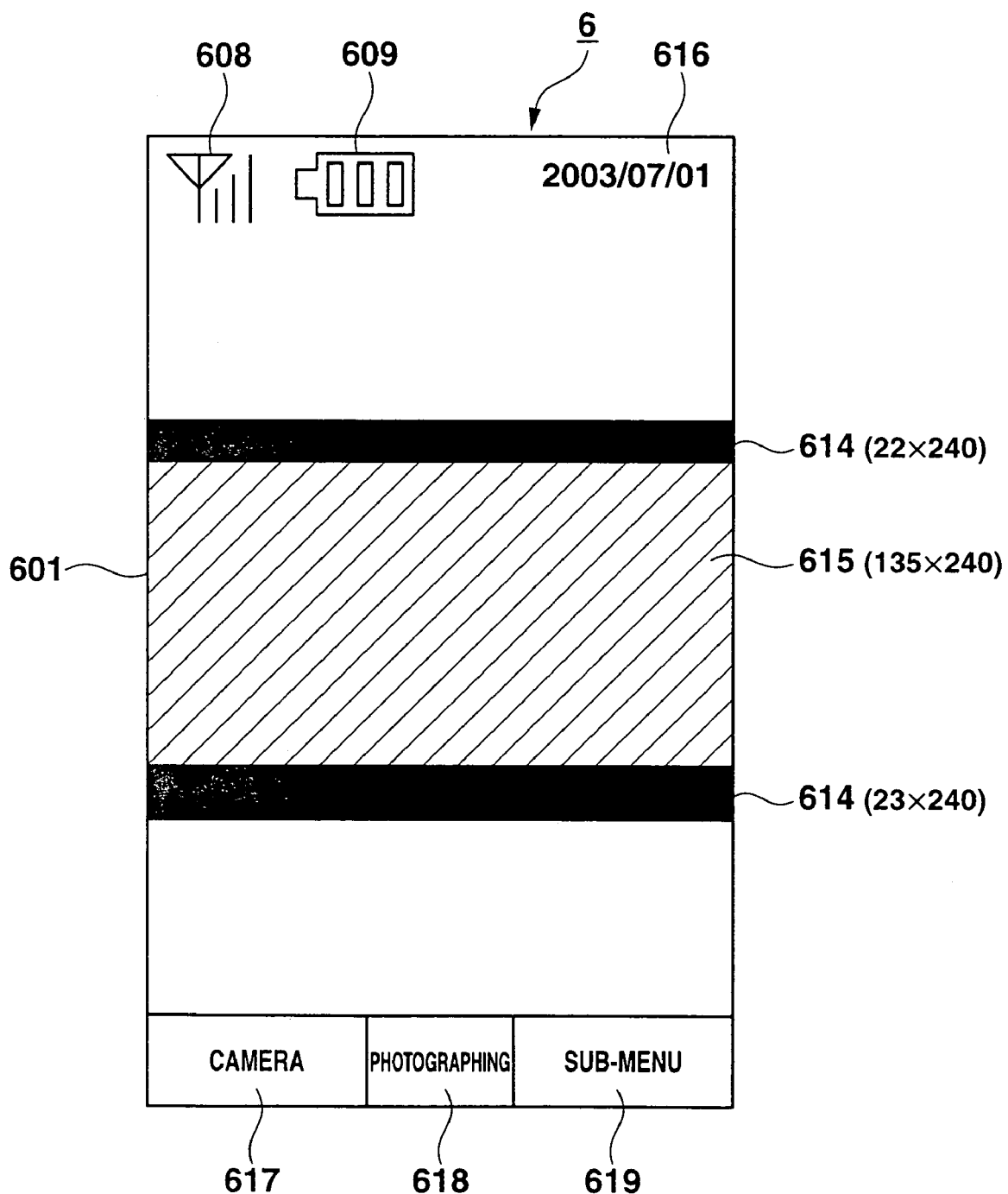
FIG. 20 is a diagram showing a display form in a movie mode (the cinema size) of a vertical display.

Next, it is determined whether or not an instruction to play back is detected (step S70), and an instruction to play back is generated due to the center of the second side switch 4 being pressed down, and when this is detected, the movie file is expanding-processed and played back (step S71). At this time, based on the determined result in step S61, when the determination in step S61 is NO and the portable telephone 1 is in a state in which a movie is watched so as to keep the display device 6 with the longer side at the top as shown in FIG. 14A, the movie photographed in the normal size is displayed in full-screen on the display device 6 as shown in FIG. 19. On the other hand, when the determination in step S61 is YES and the portable telephone 1 is in a state in which the movie is watched so as to keep the display device 6 with the shorter side at the top as shown in FIG. 1, the movie 615 photographed in the cinema size is displayed on the central portion of the display device 6 along with the top and bottom black pictures 614 as shown in FIG. 20. Accordingly, in the state of playback-displaying the cinema-sized movie shown in FIG. 20, as illustrated, the receiving state icon 608, battery residual quantity icon 609, and current date 616 are displayed at the top portion of the top and bottom blank portions of the display device 6, and operational icons 617, 618, and 619 respectively corresponding to the movie playback key 85, enter key 82, and address book key 83 of the key input unit 8 are displayed at the bottom blank portion.

On the other hand, as a result of the determination in step S68, when the selected movie is a file photographed in, not the cinema size, but the normal size, the top frame thereof is displayed in full-screen (step S75). In accordance therewith, as shown in FIG. 19, the top frame of the normal-sized movie file is displayed in full-screen on the display device 6.

Figure 21:
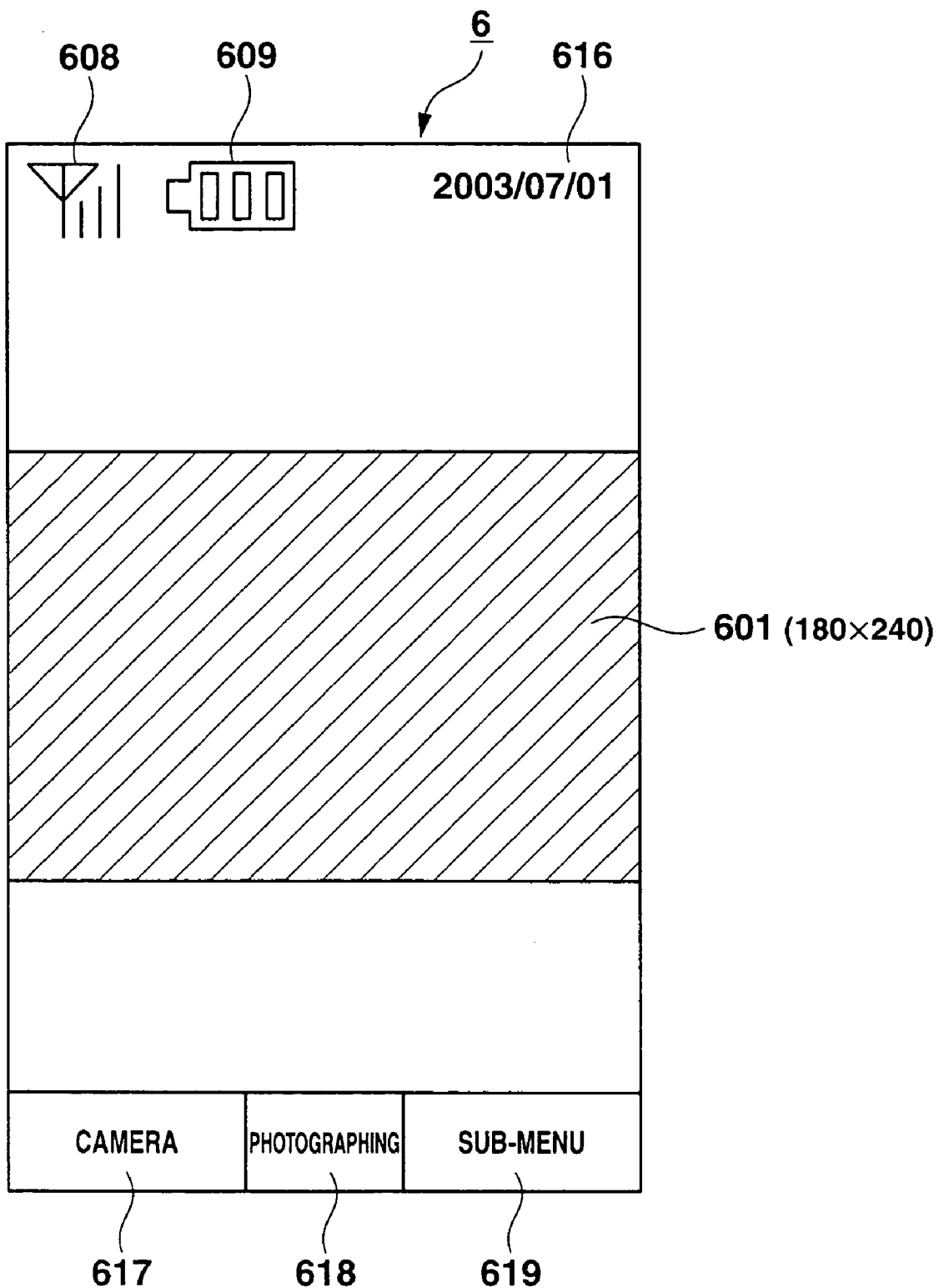
FIG. 21 is a diagram showing a display form of a movie in a camera mode and a movie mode (the normal size) of a vertical display.

Next, it is determined whether or not an instruction to play back is detected (step S75), and an instruction to play back is generated due to the center of the second side switch 4 being pressed down, and when this is detected, the movie file is expanding-processed and played back (step S71). At this time, based on the determined result in step S61, when the determination in step S61 is NO and the portable telephone 1 is in a state in which the movie is watched so as to keep the display device 6 with the longer side at the top as shown in FIG. 14A, a movie photographed in the cinema size is displayed in full-screen on the display device 6 as shown in FIG. 19. On the other hand, when the determination in step S61 is YES and the portable telephone 1 is in a state in which the movie is watched so as to keep the display device 6 with the shorter side at the top as shown in FIG. 1, a movie photographed in the normal size is displayed on the central portion of the display device 6 as shown in FIG. 21. Accordingly, in the state of playback-displaying the normal-sized movie shown in FIG. 21 as well, as illustrated, the receiving state icon 608, battery residual quantity icon 609, and current date 616 are displayed at the top portion of the top and bottom blank portions in the display area of the display device 6, and the operational icons 617, 618, and 619 respectively corresponding to the movie playback key 85, enter key 82, and address book key 83 of the key input unit 8 are displayed at the bottom blank portion.

When the cinema-sized or normal-sized movie has been played back by the above-described processings, it is determined whether or not the playback of the movie is completed (step S72), and when the playback is completed, it is determined whether or not a release from the movie playback mode is detected. Then, until the time when a release from the movie playback mode is detected, the processings from step S66 are repeated, and at a point in time when a release from the movie playback mode is detected, the routine returns to the start of the flowchart shown in FIG. 7, and proceeds to a receiving stand-by state.

Figure 22:
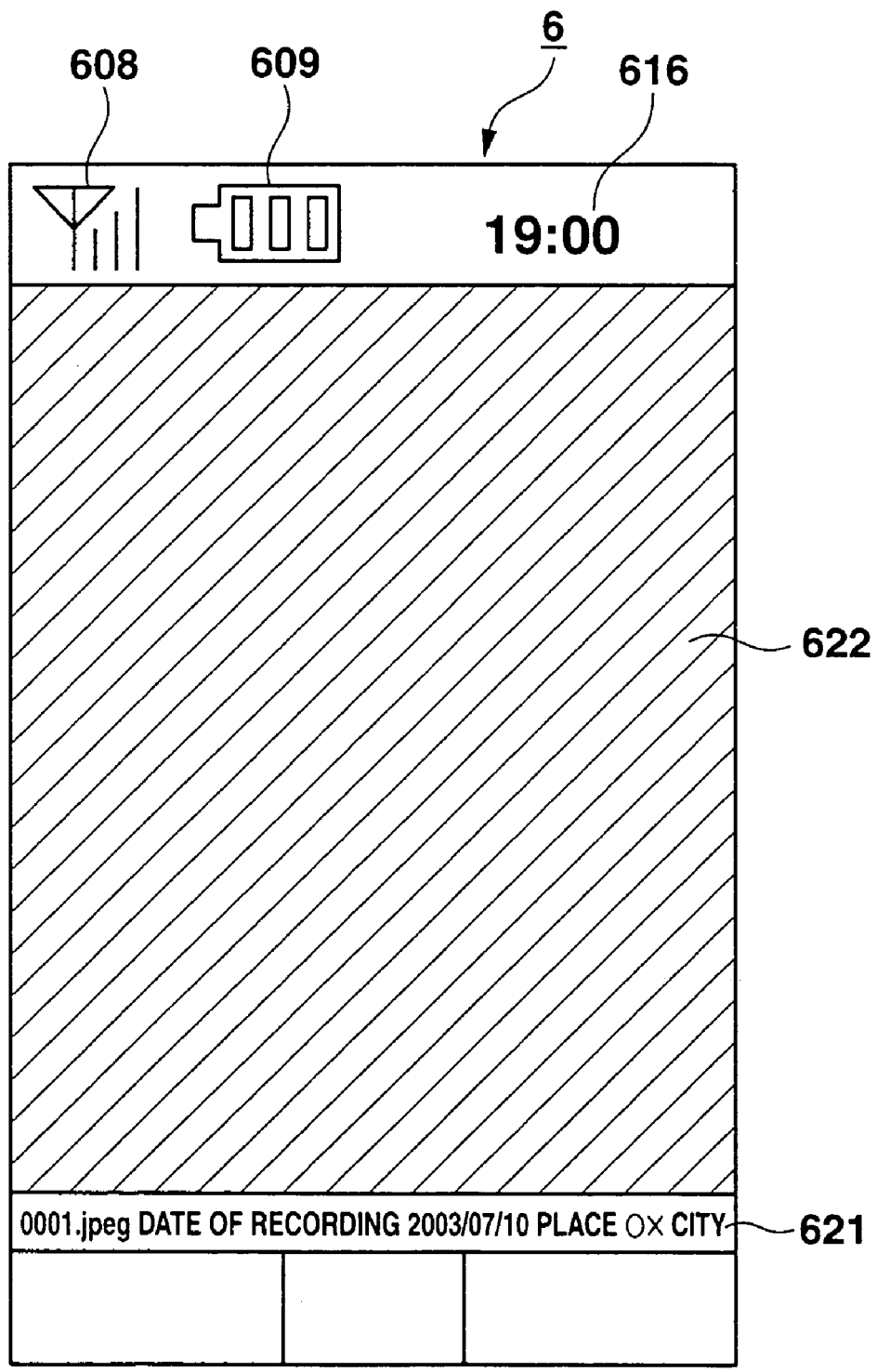
FIG. 22 is a diagram showing a display state in a normal stand-by size.

In this receiving stand-by state, as shown in FIG. 22, when a picture photographed by the self-device is set as a wall paper 622, the normal-sized wall paper 622 is vertically displayed on the display device 6 which is in the wide size and with the shorter side at the top. Accordingly, because blank portions are remained at the top and bottom portions of the display device 6, as illustrated, the receiving state icon 608, battery residual quantity icon 609, and current time 616 are displayed at the top portion of the top and bottom blank portions, and an area 621 on which Exif data of the picture file used as the wall paper 622 is displayed can be provided at the bottom blank portion.

Second Embodiment

Hereinafter, a second embodiment of the present invention will be described with reference to the drawings. Portions which have the same configurations as those of the first embodiment are denoted with the same reference numerals, and descriptions thereof will be omitted.

Figure 23:
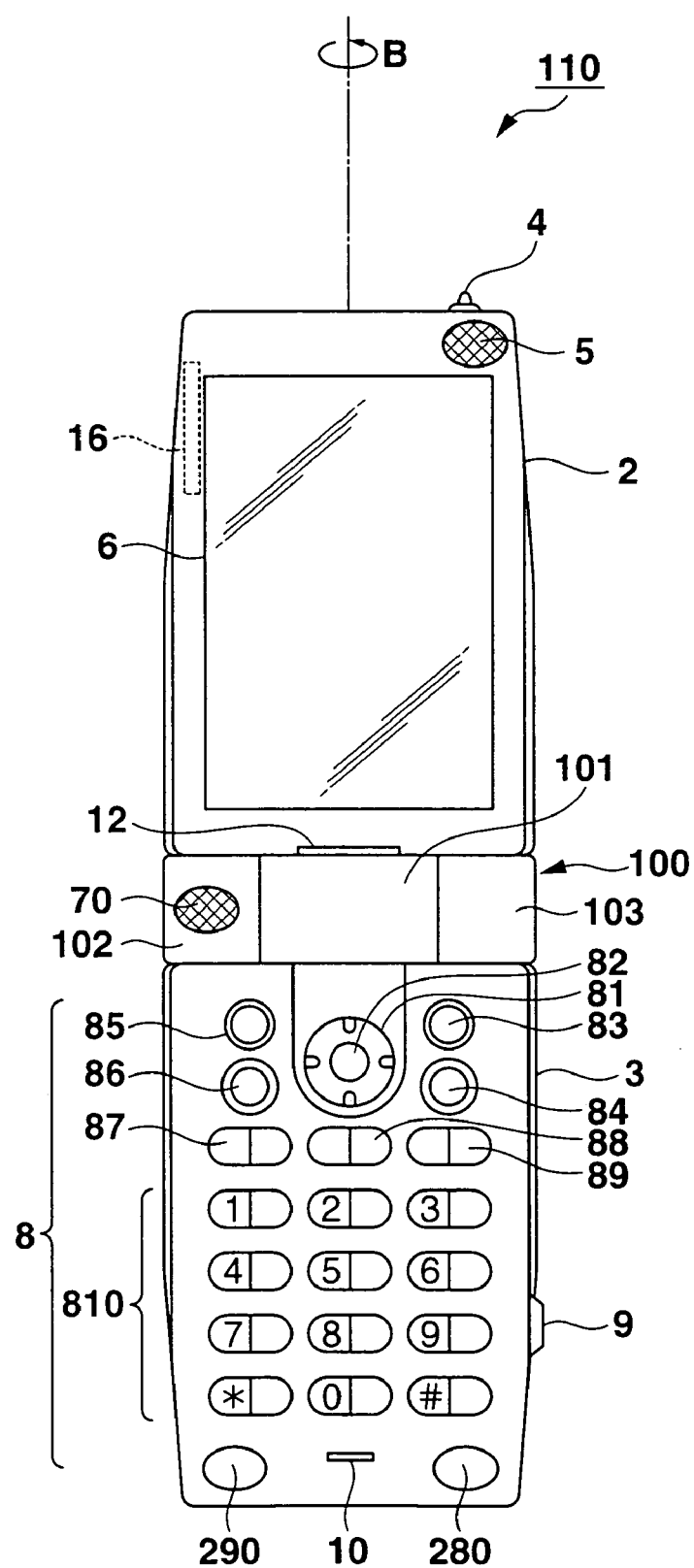
FIG. 23 is a front view of a portable telephone 110 according to a second embodiment of the present invention in a state in which a cover thereof is opened.

FIG. 23 is an external view corresponding to a front view of a portable telephone 110 according to the second embodiment in a state in which the cover thereof is opened. Points different from the above-described first embodiment are:

(1) The first speaker 5 is an electrodynamic loudspeaker, and is disposed at the corner portion which is the inner surface and at the free end side of the cover unit 2.

(2) A second speaker 70 is disposed on the surface at the side of the fixing unit 102, which is the same as the surface of the main body unit 3 on which the key input unit 8 or the like are provided, of a pair of left and right fixing portions 102 and 103 of the first hinge 100. The second speaker 70 is an electrodynamic loudspeaker in the same way as the first speaker.

(3) A first magnetic detecting unit 280 and a second magnetic detecting unit 290 are disposed at the corner portions at the free end side on the inner surface of the main body unit 3. The first magnetic detecting unit 280 is disposed at a position superposed with the first speaker 5 in a state the cover unit 2 is folded such that the display device 6 and the key input unit 8 are made to face one another. Accordingly, the first magnetic detecting unit 28 in the folded state can detect magnetism of a magnetic circuit which the first speaker 5 has, and outputs the presence/absence of the detection of the magnetism. The second magnetic detecting unit 290 is disposed at a position directly below the first speaker 5 in the state of FIG. 25 in which the cover unit 2 is opened from the state of FIG. 24A, and is rotated with the first hinge 100 being as a shaft, and the cover unit 2 is rotated 180° with the second hinge 12 being as a shaft, and the cover unit 2 is closed again. Accordingly, the second magnetic detecting unit 290 in this folded state can detect magnetism of a magnetic circuit which the first speaker 5 has, and outputs the presence/absence of the detection of the magnetism.

Figure 26:
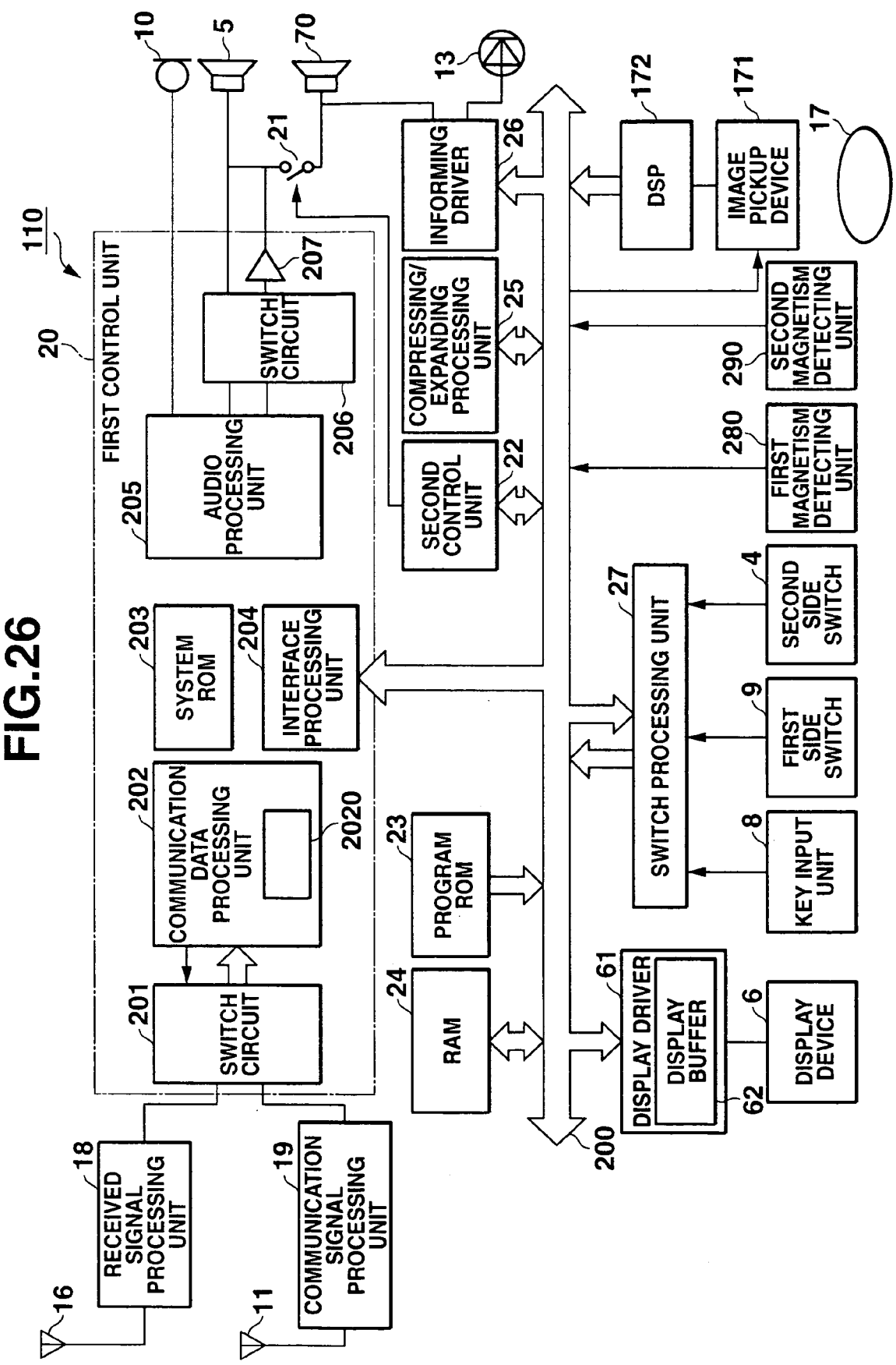
FIG. 26 is a block diagram showing a circuit configuration of the portable telephone.

FIG. 26 is a block diagram showing a circuit configuration of the portable telephone 110. The portable telephone 110 according to the second embodiment has not the lens barrier detecting unit 30 detecting opening and closing of the lens barrier. In place of the first angle detecting unit 28 and the second angle detecting unit 29, the first magnetic detecting unit 280 and the second magnetic detecting unit 290 are provided. The first magnetic detecting unit 280 and the second magnetic detecting unit 290 detect magnetism of a magnetic circuit which the first speaker 5 has, and outputs signals to the second control unit 22.

Figure 27:
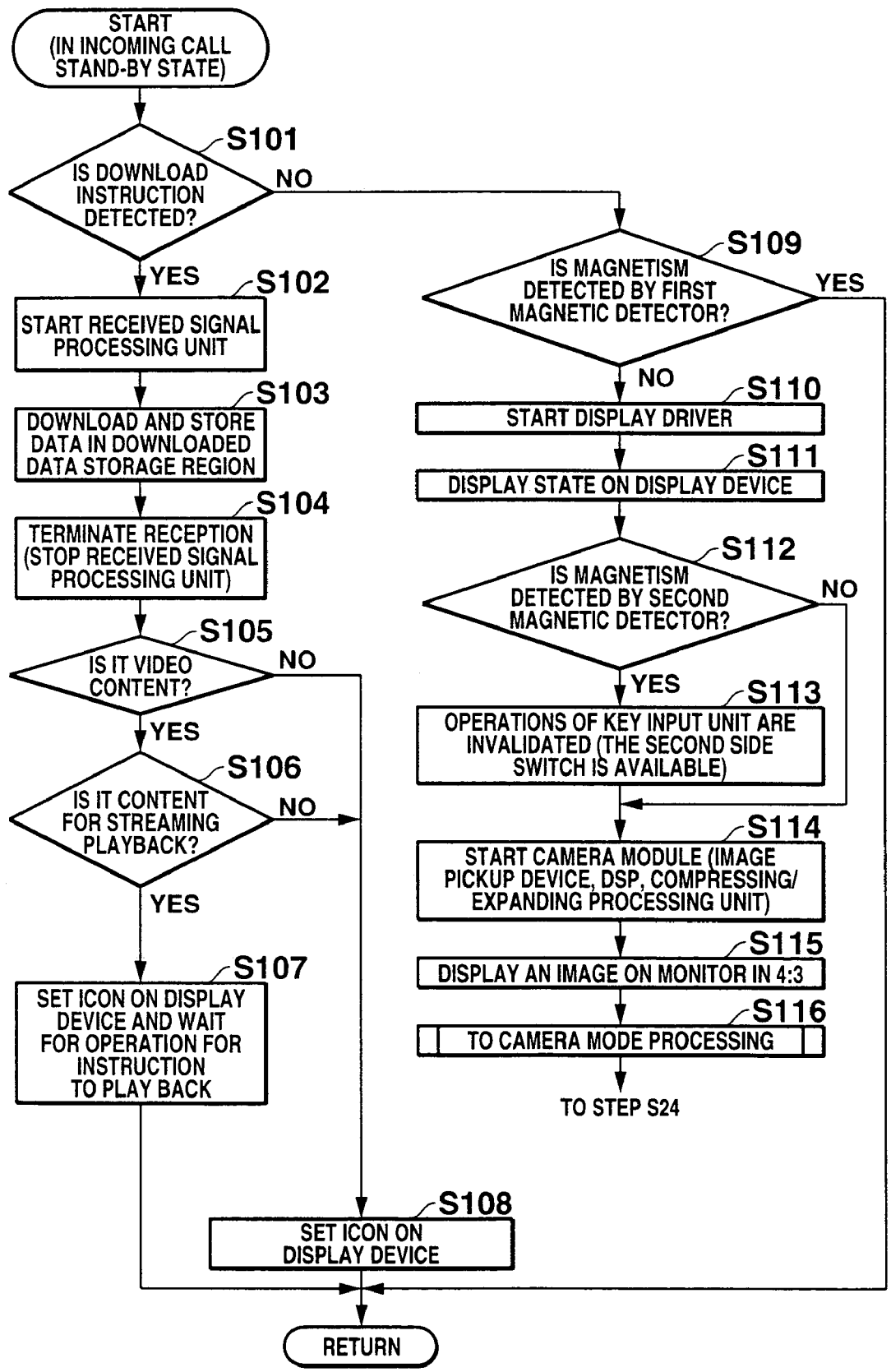
FIG. 27 is a flowchart showing entire processing procedures.

In the second embodiment relating to the above-described configuration, when the portable telephone 110 is in an incoming call stand-by state, the first control unit 20 executes processings in steps S101 through S108 in the flowchart of FIG. 27 based on the program stored in the system ROM 203. Namely, first, it is determined whether or not a download instruction is detected (step S101). The download instruction means, not only the case in which the user carries out a download instruction by a manual operation by operating the network connecting key 84, but also the case in which, due to a time to start downloading and an address (URL) being registered with schedule data in advance, a start in a data communication mode is instructed, for example, in the middle of night.

When the download instruction is detected, the received signal processing unit 18 is operated (step S102). The portable telephone 110 is connected to a network via the received signal processing unit 18, and a compressed multimedia file (illustration, still picture, moving picture (including an image of the aspect ratio of 16:9), melody, audio) which is received through the network connection is stored in the downloaded data storage region 244 (step S103). Accompanying the completion of downloading the multimedia file, reception terminating processing is executed, and the received signal processing unit 18 is stopped (step S104).

It is determined whether or not the multimedia file stored in the downloaded data storage region 244 in step S103 is a video content (step S105). When the multimedia file is a video content, it is determined whether or not the video content is a content for streaming playback (a pseudo streaming playback service in which the content is played back once after being downloaded, and is erased thereafter) (step S106). When the video content is a content for streaming playback, an icon denoting that the content for streaming playback is stored in the downloaded data storage region 244 is displayed on the display device 6, and the portable telephone 1 is made to be in a state of waiting for an instruction to play back (step S107). When the determined result in step S105 is a result in which the multimedia file is not a video content, and when the determined result in step S106 is a result in which the video content is not a content for streaming playback, but a content without limit to playback, a predetermined icon different from the icon displayed in step S107 is displayed on the display device 6 (step S108).

Figure 24A:
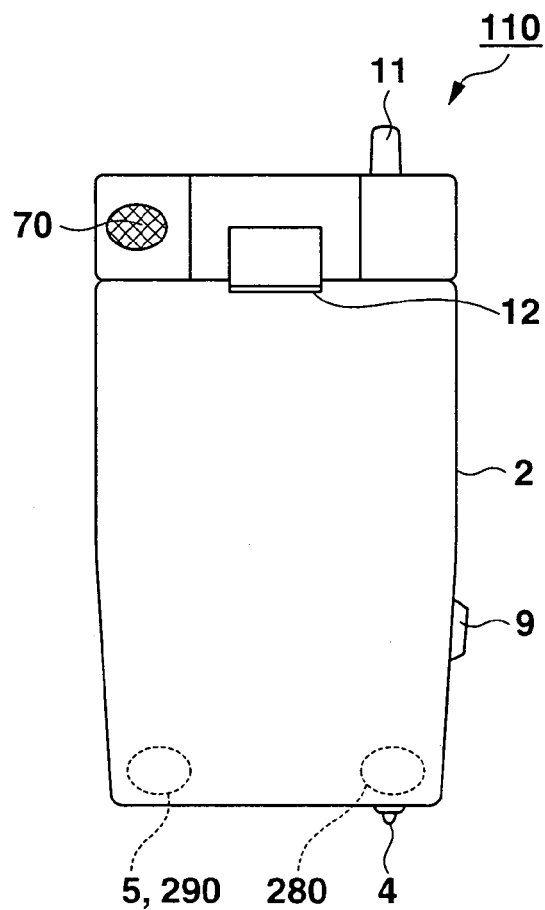
FIG. 24A is a front view in a state in which the cover unit is folded so as to be a form in which a display device and a key input unit are made to face one another.
Figure 24B:
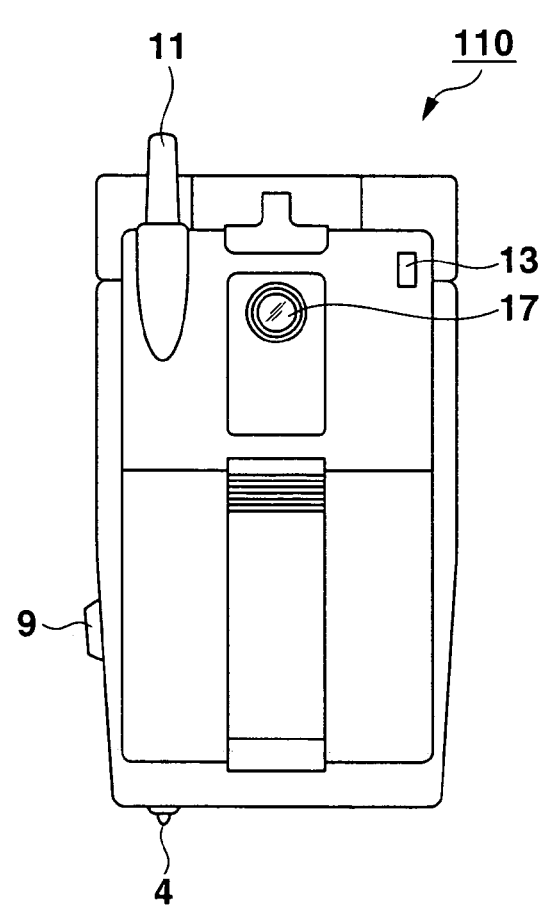
FIG. 24B is a rear view in the same state.

On the other hand, as a result of the determination in step S101, when a download instruction is not detected, the second control unit 22 executes switching processings accompanying the detection of opening and closing states of the cover unit 2 and the main body unit 3 in steps S109 through S116 based on the program stored in the program ROM 23. Namely, it is determined whether or not the magnetism of the first speaker 5 is detected by the first magnetic detecting unit 280 (step S109). At that time, when the portable telephone 110 is, as shown in FIG. 24A and FIG. 24B, in a state in which the cover unit 2 is folded such that the display device 6 and the key input unit 8 are made to face one another (the folded state at the time of carrying), the second magnetic detecting unit 290 can detect the magnetism of the magnetic circuit which the first speaker 5 has. Accordingly, the determination in step S109 is made to be YES, and in this case, the routine returns without proceeding to the camera mode processing (step S116). In this way, because there is no case in which the routine proceeds to the camera mode when the portable telephone 110 is in a state in which the cover unit 2 is folded such that the display device 6 and the key input unit 8 are made to face one another, there is no case in which the first side switch 9 functions as a shutter key.

Figure 25:
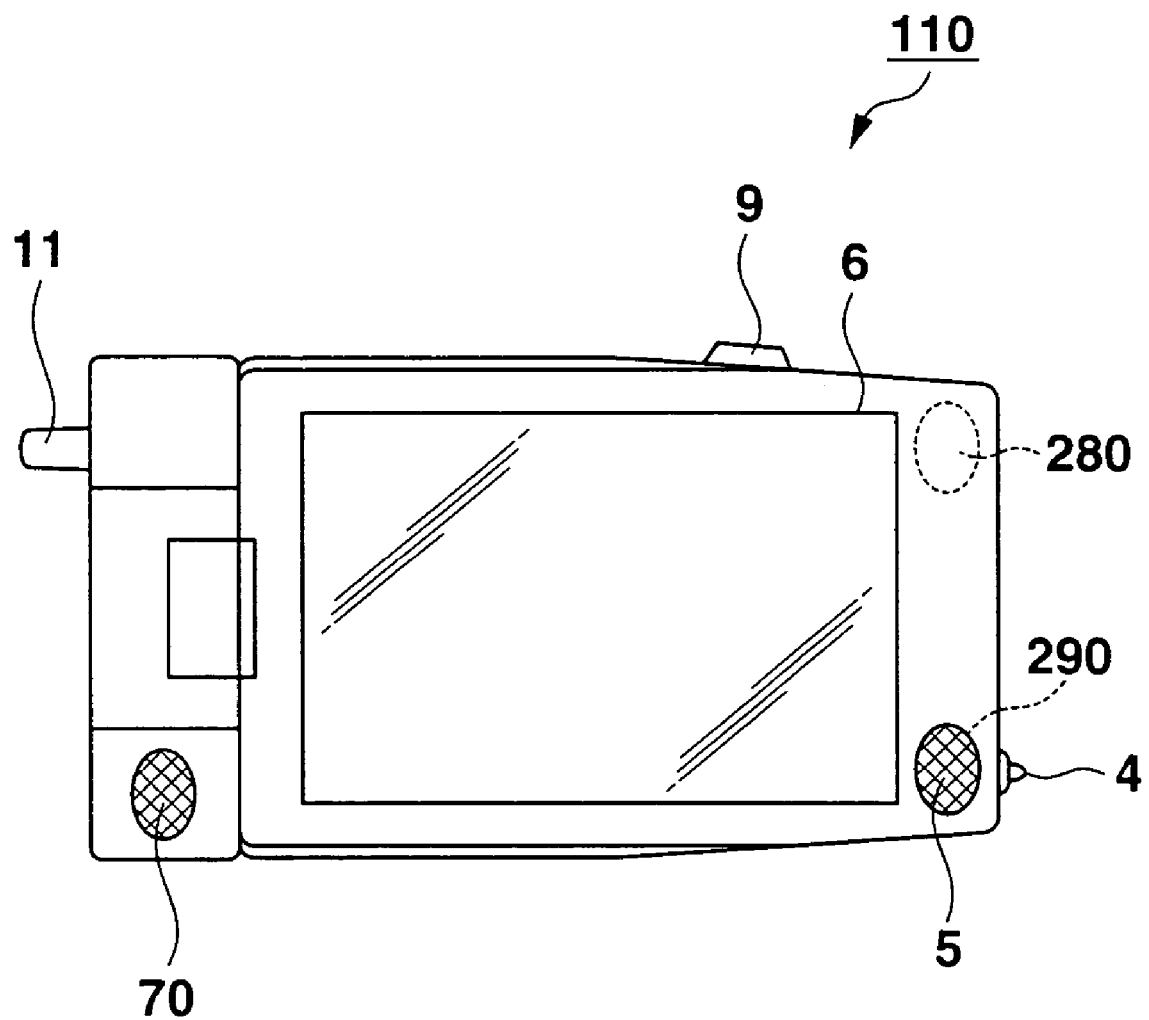
FIG. 25 is an external view of the portable telephone 110 according to a modification of the second embodiment in which the display device, first speaker, and second speaker are positioned at the top surface and are made to face the user.

However, as shown in FIG. 25, when the cover unit 2 is made to have an angle greater than or equal to a predetermined angle with respect to the main body unit 3 due to the cover unit 2 being opened, the first magnetic detecting unit 280 is made to be away from the first speaker 5, and is made to be in a state of non-detecting magnetism (step S109; NO). In this case, first, the display driver 61 is started (step S110), and a state display such as displaying a stand-by screen on the display device 6, or the like is carried out (step S111). Moreover, it is determined whether or not the second magnetic detecting unit 290 has detected the magnetism (step S112).

When the determination in step S112 is YES, and the determination in step S109 is NO, in the state of FIG. 24A, the cover unit 2 is opened and rotated with the first hinge 100 being as a shaft (step S109; YES), and the cover unit 2 is rotated with the second hinge 12 being as a shaft, and is closed again (step S112; YES). Accordingly, as shown in FIG. 25, the cover unit 2 is being folded onto the inner surface of the main body unit 3 on which the ten key 810 or the like are provided so as to make the display device 6 side thereof be the top surface.

When the portable phone 110 is in the state of FIG. 25, the portable phone 110 is made to be in a state in which operations with respect to the key input unit 8 (the cross key 81, enter key 82, address book key 83, network connecting key 84, movie playback key 85, mail key 86, off-hook key 87, clear key 88, on-hook key 89, and ten key 810) are invalidated, and is maintained to be in a state in which an operation of the second side switch 4 becomes effective (step S113). Namely, in order to prevent from operational errors, the portable phone 110 is made to be in a state in which all the operations with respect to the key input unit 8 are invalidated, and the operation of the side switch 4 becomes effective. Next, a camera module composed of the image pickup device 171, DSP 172, and compressing/expanding processing unit 25 is started (step S114), and the object image is displayed on the display device 6 (step S115), and the camera mode processing is started (step S116). As described above, because the effective pixel region of the image sensor in the present embodiment is fixed to the aspect ratio of 4:3, the object image is displayed in the aspect ratio of 4:3 on the display device 6 in step S115.

As a result of the determination in step S112, when the magnetism of the first speaker 5 is not detected by the second magnetic detecting unit 290, the portable telephone 110 is in a state in which the cover unit 2 is merely opened, as shown in FIG. 23. In this case, the display device 6 faces the side opposite to the surface of the main body unit 3 on which the image pickup lens 17 is positioned, and photographing by the user is assumed. Therefore, in this case as well, the camera module composed of the image pickup device 171, DSP 172, and compressing/expanding processing unit 25 is started (step S114), and the object image is displayed on the display device 6 (step S115), and the camera mode processing is started (step S116).

Thereafter, the routine proceeds to step S24 of FIG. 8, and it is determined whether or not a movie playback mode is selected (step S24), and when the movie playback mode is not selected, the routine proceeds to another mode processing. When the movie playback mode is selected, a display in wide-screen made to correspond to the direction with the shorter side at the top is set with respect to the display driver 61 (step S25), and the routine proceeds to the movie playback processing (step S26).

Figure 28:
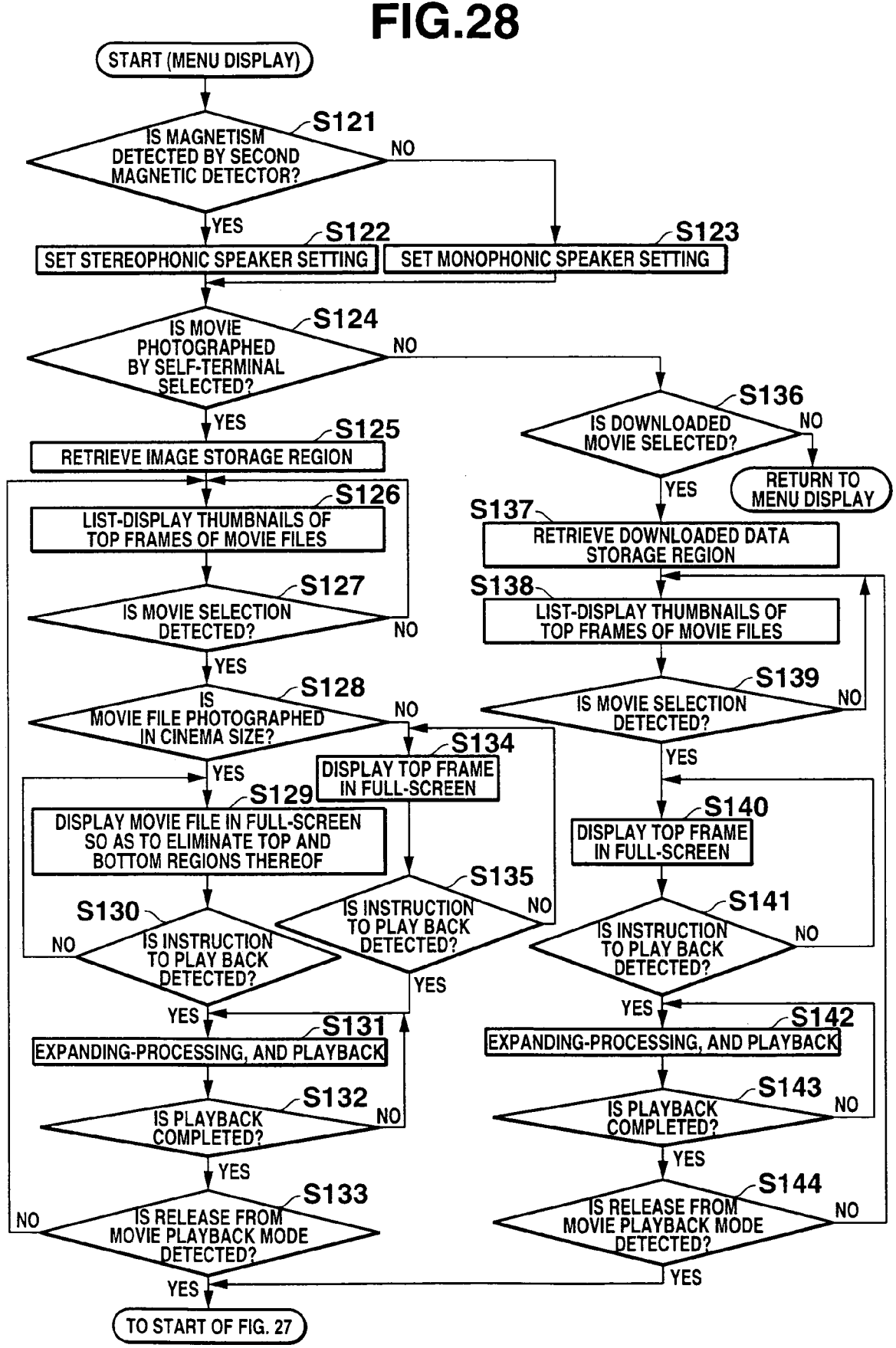
FIG. 28 is a flowchart showing the details of movie playback mode processing.

FIG. 28 is a flowchart showing the details of the movie playback mode processing in the second embodiment (corresponding to step S26 (FIG. 8) in the first embodiment). In this flowchart, steps S121 through S123 show the procedure of movie file playing-back processings, and steps S124 (YES determination) through S133 show the procedure of processings in which a movie file photographed by the self device is played back.

Figure 29A:
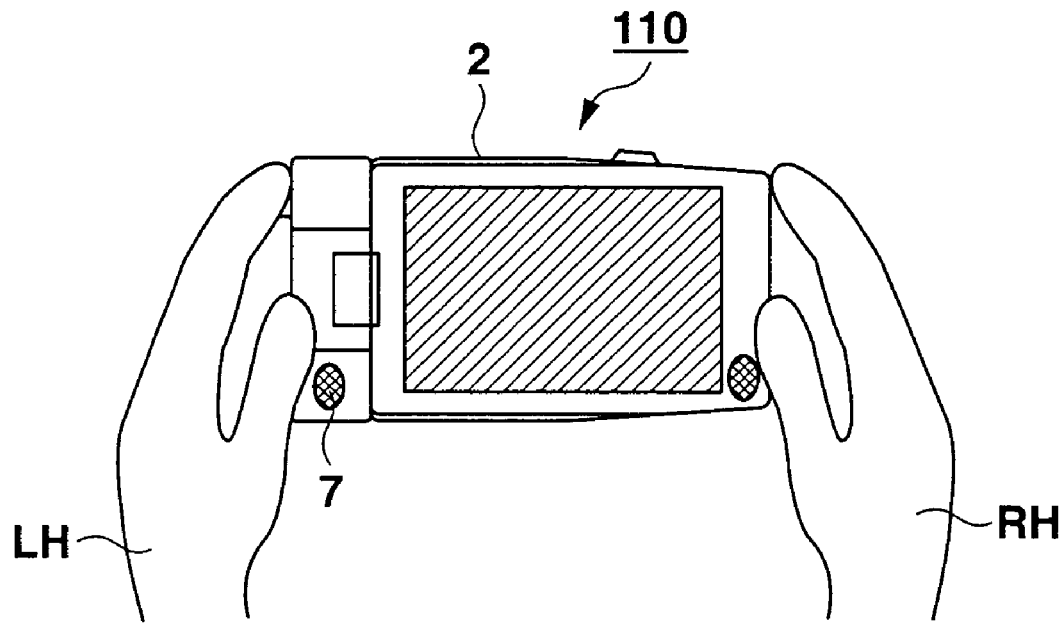
FIG. 29A is a diagram showing a case in which the user holds the portable telephone in a movie playback mode when the portable telephone is in the sate of FIG. 25.
Figure 29B:
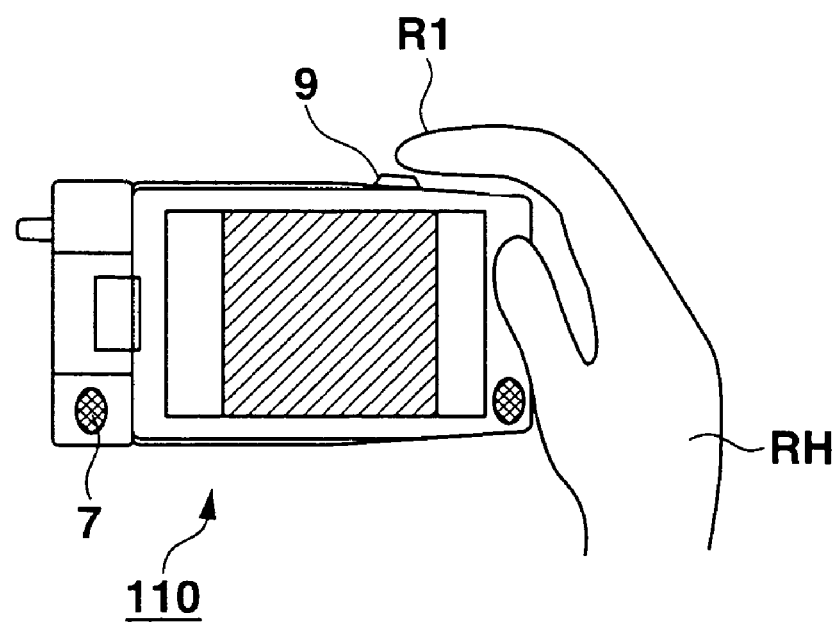
FIG. 29B is a diagram showing a case in which the user holds the portable telephone in a camera mode.

First, when this movie playback mode is executed, it is determined whether or not magnetism is detected by the second magnetic detecting unit 290 (step S121). The case in which the determination in step S121 is YES is a state in which, as described above, the cover unit 2 is folded onto the inner surface of the main body unit 3 on which the ten key 810 and the like are provided so as to make the display device 6 side thereof be the top surface. This state in the movie playback mode is, as shown in FIG. 29A, the case in which a movie is watched while holding the both end portions of the portable telephone 110 in a state of being folded with the both hands LH and RH so as to keep the display device 6 with the longer side at the top. At the time of playing-back a movie when the portable telephone 110 is in the state of FIG. 29A, because an appropriate stereophonic effect due to sounding from the first speaker 5 and the second speaker 70 is brought about, stereophonic speaker setting for turning the first speaker 5 and the second speaker 70 on by closing the switch 21 is carried out (step S122).

The case in which the determination in step S121 is NO is a case in which the cover unit 2 is merely opened from the state of FIG. 24A and rotated with the first hinge 100 being as a shaft (step S109; YES), and the portable telephone 110 is in the state of FIG. 23, and a movie is watched by holding the main body unit 3 so as to keep the display device 6 with the shorter side at the top. However, at the time of playing-back the movie when the portable telephone 110 is in the state of FIG. 23, if the first speaker 5 and the second speaker 70 are turned on, the portable telephone 110 sounds from the upper and lower portions, and because a feeling of that something is wrong is brought about, monophonic speaker setting in which only the first speaker 5 is turned on by opening the switch 21 is carried out (step S123).

Next, it is determined whether or not a movie photographed by the portable telephone 110 by the user is selected (step S124). When the movie photographed by the self-terminal is selected, the image storage region 243 is retrieved (step S125), and the top frames of the movie files stored in the image storage region 243 are list-displayed in thumbnails on the display device 6 (step S126). Because the movie files photographed in the 4:3 size and the movie files photographed in the 16:9 size (cinema size photographing) are stored so as to be mixed together in the image storage region 243, as shown in FIG. 18, thumbnails 620 are displayed in different sizes corresponding to the respective sizes. At this time, the top frames of the movie files photographed in the cinema size are made to be thumbnails so as to eliminate the black pictures 614 and to magnify, and as illustrated, the menu is displayed such that the heights of the respective thumbnails 620 to be displayed are made to be equal.

While maintaining the state of displaying the menu shown in FIG. 15, the portable telephone 110 is on standby until the time when one of the movies is selected (step S127). The selection of a movie file to be played back is carried out by a roto-click (rotation) in the vertical direction of the second side switch 4, and when one of the movies is selected, it is determined whether or not the movie is a file photographed in the cinema size (step S128). When the movie is a file photographed in the cinema size, a picture from which the respective black pictures 614 at the top and bottom regions of the movie file are eliminated is displayed in full-screen on the display device 6 (step S129). Accordingly, when the movie file photographed in the cinema size is selected, as shown in FIG. 16, the top frame of the movie file is displayed in full-screen (240×428 dots) on the display device 6.

Next, it is determined whether or not an instruction to play back is detected (step S130), and an instruction to play back is generated due to the center of the second side switch 4 being pressed down, and when this is detected, the movie file is expanding-processed and played back (step S131). At this time, based on the determined result in step S61, when the determination in step S61 is NO, and the portable telephone 110 is in a state in which the movie is watched so as to keep the display device 6 with the longer side at the top as shown in FIG. 29A, a movie photographed in the normal size is displayed in full-screen on the display device 6 as shown in FIG. 16. When the determination in step S61 is YES, and the portable telephone 110 is in a state in which the movie is watched so as to keep the display device 6 with the shorter side at the top as shown in FIG. 23, the movie photographed in the cinema size is displayed on the central portion of the display device 6 along with the top and bottom black pictures 614 as shown in FIG. 17. Accordingly, in the state of playback-displaying the cinema-sized movie shown in FIG. 17, as illustrated, the receiving state icon 608, the battery residual quantity icon 609, and the current date 616 are displayed at the top portion of the top and bottom blank portions of the display device 6, and the operational icons 617, 618, and 619 respectively corresponding to the movie playback key 85, enter key 82, and address book key 83 of the key input unit 8 are displayed at the bottom portion.

On the other hand, as a result of the determination in step S128, when the selected movie is a file photographed in, not the cinema size, but the normal size, the top frame thereof is displayed in full-screen (step S135). In accordance therewith, as shown in FIG. 16, the top frame of the normal-sized movie file is displayed in full-screen on the display device 6.

Next, it is determined whether or not an instruction to play back is detected (step S135), an instruction to play back is generated due to the center of the second side switch 4 being pressed down, and when this is detected, the movie file is expanding-processed and played back (step S131). At this time, based on the determined result in step S121, when the determination in step S121 is NO, and the portable telephone 110 is in a state in which a movie is watched so as to keep the display device 6 with the longer side at the top as shown in FIG. 29A, the movie photographed in the cinema size is displayed in full-screen on the display device 6 as shown in FIG. 16. When the determination in step S121 is YES, and the portable telephone 110 is in a state in which a movie is watched so as to keep the display device 6 with the shorter side at the top as shown in FIG. 23, the movie photographed in the normal size is displayed on the central portion of the display device 6 as shown in FIG. 21. Accordingly, in the state of playback-displaying the normal-sized movie shown in FIG. 21 as well, as illustrated, the receiving state icon 608, battery residual quantity icon 609, and current date 616 are displayed at the top portion of the top and bottom blank portions of the display area 601 on the display device 6, and the operational icons 617, 618, and 619 respectively corresponding to the movie playback key 85, enter key 82, and address book key 83 of the key input unit 8 are displayed at the bottom portion.

When the cinema-sized or normal-sized movie has been played back by the above-described processings, it is determined whether or not the playback of the movie is completed (step S132), and when the playback has been completed, it is determined whether or not a release from the movie playback mode is detected (step S133). Then, until the time when a release from the movie playback mode is detected, the processings from step S126 are repeated, and at a point in time when a release from the movie playback mode has been detected, the routine returns to the start of the flowchart shown in FIG. 27, and proceeds to a receiving stand-by state.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means. In the above embodiments, the wireless high-speed data communication based on the HDR (High Data Rate) in accordance with the CDMA 20000 1xEV-DO was described in detail. However, it may be the wireless high-speed data communication by the HSDPA (High Speed Downlink Packet Access) technique in accordance with the so-called $3.5^{th}$ generation portable telephone service.

What is claimed is:

1. An image display apparatus comprising:
   an image pickup device;
   a display device having an aspect ratio corresponding to a wide-display;
   a first display control unit configured to display an image on the display device in full-screen when the image is in an aspect ratio corresponding to the wide-display, or in a manner according to an aspect ratio based on a capture size of the image pickup device;
   a first speaker disposed in a vicinity of the display device;
   a second speaker disposed at a side opposite to the first speaker with respect to the display device;
   a determining unit which determines whether the display device is used with a longer side at a top or with a shorter side at the top;
   a first sounding control unit which operates the first speaker and the second speaker when it is determined by the determining unit that the display device is used with the longer side at the top, and which operates one of the first speaker and the second speaker when it is determined by the determining unit that the display device is used with the shorter side at the top;
   a first body which houses the display device and the first speaker;
   a second body;
   a first hinge which has a first rotation shaft rotating in a direction in which the second body overlaps the first body, and which connects the first body and the second body so as to be freely rotatable by the first rotation shaft, and at which the second speaker is disposed; and
   a second hinge which has a second rotation shaft rotating in a direction perpendicular to the first rotation shaft, and which connects the first body and the first hinge so as to be freely rotatable by the second rotation shaft, wherein the determining unit determines whether the display device is used with the longer side at the top when the first body overlaps the second body such that the display device is outwardly set;
   wherein the first body comprises a magnetic detector which detects a magnetism of the first speaker, and the determining unit determines whether the first body overlaps the second body such that the display device is outwardly set based on a result of detection by the magnetic detector.

2. An image display apparatus according to claim 1, wherein the second body comprises:
   a wireless communication device;
   a first input device; and
   a second sounding control unit which drives the first speaker when communication processing by the wireless communication device is being carried out based on information input by the first input device.

* * * * *